(12) United States Patent
Furman et al.

(10) Patent No.: US 10,706,134 B2
(45) Date of Patent: Jul. 7, 2020

(54) METHOD AND SYSTEM FOR PROVIDING A BRAIN COMPUTER INTERFACE

(71) Applicant: Arctop LTD, Tel Aviv OT (IL)

(72) Inventors: Daniel Furman, San Francisco, CA (US); Eitan Kwalwasser, Tel Aviv (IL)

(73) Assignee: Arctop LTD, Tel Aviv (IL)

( * ) Notice: Subject to any disclaimer, the term of this patent is extended or adjusted under 35 U.S.C. 154(b) by 117 days.

(21) Appl. No.: 15/645,169

(22) Filed: Jul. 10, 2017

(65) Prior Publication Data

US 2018/0012009 A1    Jan. 11, 2018

Related U.S. Application Data

(60) Provisional application No. 62/382,445, filed on Sep. 1, 2016, provisional application No. 62/382,433, filed
(Continued)

(51) Int. Cl.
*G06F 21/32* (2013.01)
*G06N 3/04* (2006.01)
(Continued)

(52) U.S. Cl.
CPC ............ *G06F 21/32* (2013.01); *G06F 3/015* (2013.01); *G06F 21/34* (2013.01); *G06N 3/0454* (2013.01); *G06N 3/08* (2013.01); *G06N 3/084* (2013.01); *G06N 3/088* (2013.01); *G06N 20/10* (2019.01); *G06N 20/20* (2019.01); *G06N 3/0445* (2013.01); *G06N 3/0472* (2013.01); *G06N 3/126* (2013.01); *G06N 5/003* (2013.01); *G06N 5/025* (2013.01); *G06N 5/048* (2013.01); *G06N 7/005* (2013.01)

(58) Field of Classification Search
CPC ............ G06F 21/32; G06F 21/34; G06N 3/08
USPC .......................................................... 726/19
See application file for complete search history.

(56) References Cited

U.S. PATENT DOCUMENTS 6,498,955 B1    12/2002   McCarthy et al.
9,357,941 B2    6/2016    Simon
(Continued)

FOREIGN PATENT DOCUMENTS

WO    WO 2014/186739 A1    11/2014

OTHER PUBLICATIONS

Nicolas-Alonso et al., "Brain Computer Interfaces, a Review," Sensors (Basel), 2012, vol. 12, No. 2, pp. 1211-1279.
(Continued)

*Primary Examiner* — Michael Pyzocha
*Assistant Examiner* — Zoha Piyadehghibi Tafaghodi
(74) *Attorney, Agent, or Firm* — Fenwick & West LLP

(57) ABSTRACT

A method for providing a brain computer interface that includes detecting a neural signal of a user in response to a calibration session having a time-locked component and a spontaneous component; generating a user-specific calibration model based on the neural signal; prompting the user to undergo a verification session, the verification session having a time-locked component and a spontaneous component; detecting a neural signal contemporaneously with delivery of the verification session; generating an output of the user-specific calibration model from the neural signal; based upon a comparison operation between processed outputs, determining an authentication status of the user; and performing an authenticated action.

21 Claims, 13 Drawing Sheets

Related U.S. Application Data on Sep. 1, 2016, provisional application No. 62/360,640, filed on Jul. 11, 2016.

(51) Int. Cl.

| | | |
|---|---|---|
| *G06F 3/01* | (2006.01) |
| *G06N 3/08* | (2006.01) |
| *G06N 3/12* | (2006.01) |
| *G06N 7/00* | (2006.01) |
| *G06N 20/10* | (2019.01) |
| *G06N 20/20* | (2019.01) |
| *G06F 21/34* | (2013.01) |
| *G06N 5/00* | (2006.01) |
| *G06N 5/02* | (2006.01) |
| *G06N 5/04* | (2006.01) |

(56) References Cited

U.S. PATENT DOCUMENTS

| | | |
|---|---|---|
| 9,736,603 B2 | 8/2017 | Osborne et al. |
| 2009/0157813 A1 | 6/2009 | Jung et al. |
| 2009/0318773 A1 | 12/2009 | Jung et al. |
| 2012/0072289 A1 | 3/2012 | Pradeep et al. |
| 2012/0073892 A1 | 3/2012 | Hunter |
| 2012/0172743 A1 | 7/2012 | Aguilar et al. |
| 2012/0242648 A1 | 9/2012 | Baier et al. |
| 2014/0020089 A1* | 1/2014 | Perini, II ............... G06F 21/32 726/19 |
| 2015/0185825 A1 | 7/2015 | Mullins |
| 2015/0238122 A1* | 8/2015 | Navratil ................ G06F 21/32 340/5.82 |
| 2015/0297109 A1 | 10/2015 | Garten et al. |
| 2016/0073916 A1 | 3/2016 | Aksenova et al. |
| 2016/0103487 A1 | 4/2016 | Crawford et al. |
| 2017/0091741 A1* | 3/2017 | Todeschini ........... G06Q 20/201 |

OTHER PUBLICATIONS

PCT International Search Report and Written Opinion, PCT Application No. PCT/US2017/041344, dated Sep. 21, 2017, eight pages.

* cited by examiner

METHOD AND SYSTEM FOR PROVIDING A BRAIN COMPUTER INTERFACE

CROSS-REFERENCE TO RELATED APPLICATIONS

This application claims the benefit of U.S. Provisional Application Ser. No. 62/382,445, filed 1 Sep. 2016, U.S. Provisional Application Ser. No. 62/382,433, filed 1 Sep. 2016, and U.S. Provisional Application Ser. No. 62/360,640, filed 11 Jul. 2016, each of which is incorporated herein in its entirety by this reference.

TECHNICAL FIELD

This invention relates generally to the field of neural signal processing, and more specifically to an improved system and method for authentication, authorization, and continuous assessment of user profiles in the field of neural signal processing.

BACKGROUND

Brain computer interface (BCI) systems and methods can be used to interface users seamlessly with their environment and to enhance user experiences in a digital world. Such BCI systems can be used to connect one or more users to a digital universe, to provide a mechanism for security (e.g., authentication, authorization) in relation to access of sensitive information, and/or for any other suitable purpose. In particular, cybersecurity systems are essential for protecting sensitive information, for user authentication, and for user authorization, and must be robust against external and internal attacks. Current cybersecurity systems focus on multi-factor authentication and/or use of certain biometric signature types; however, such systems are becoming increasingly more subject to hacking, and new systems and methods need to be developed to provide enhanced and impenetrable security solutions.

Thus, there is a need to create a new and useful system and method for providing a brain-computer interface. This invention creates such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1A:
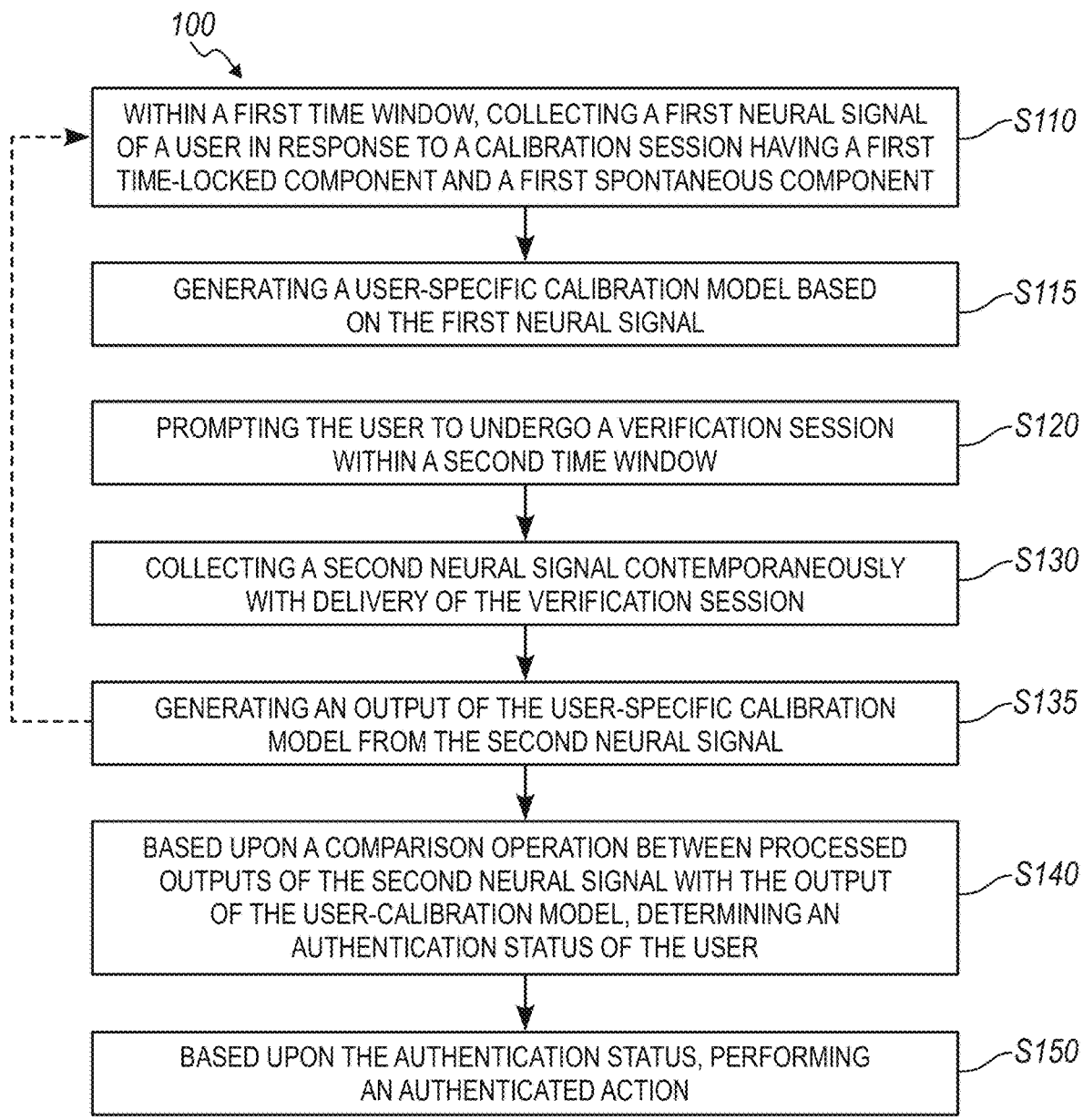
FIGS. 1A-1C depict embodiments, variations, and examples of a method for providing a brain computer interface.
Figure 1B:
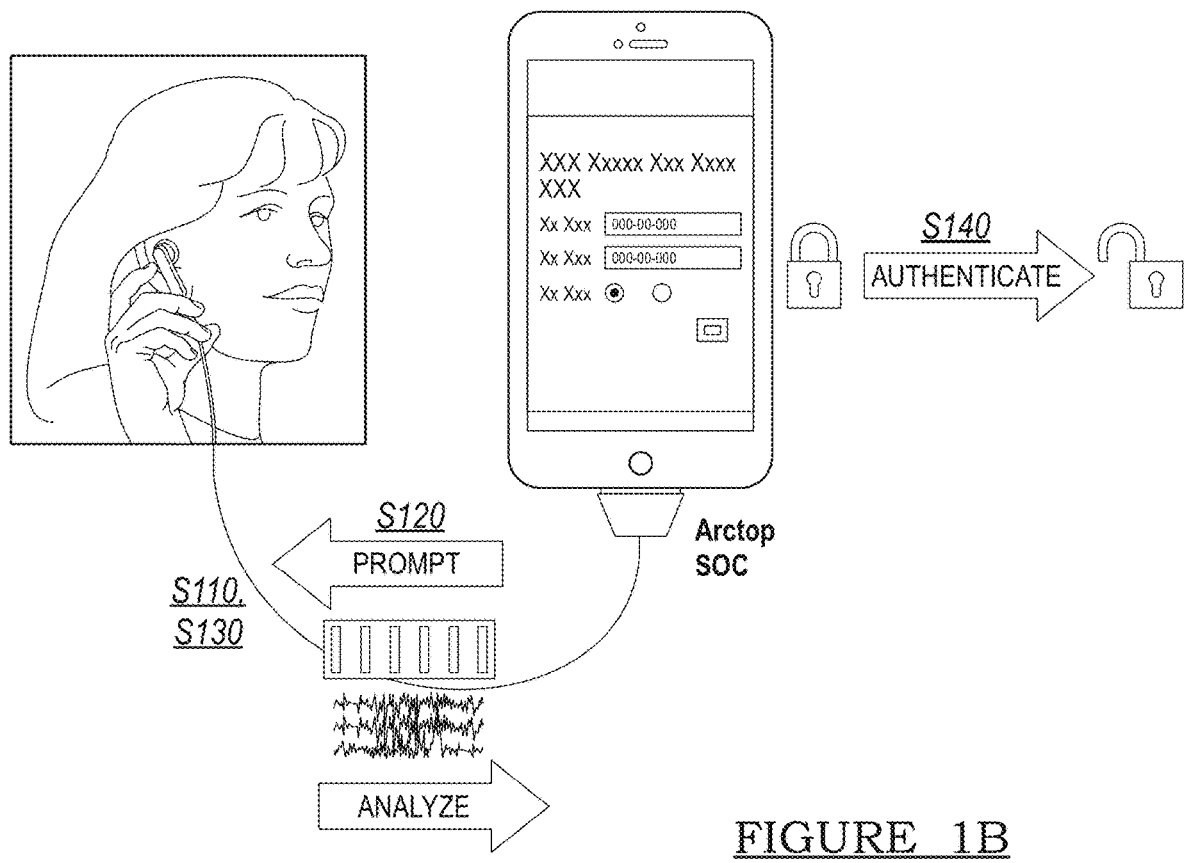
Figure 1C:
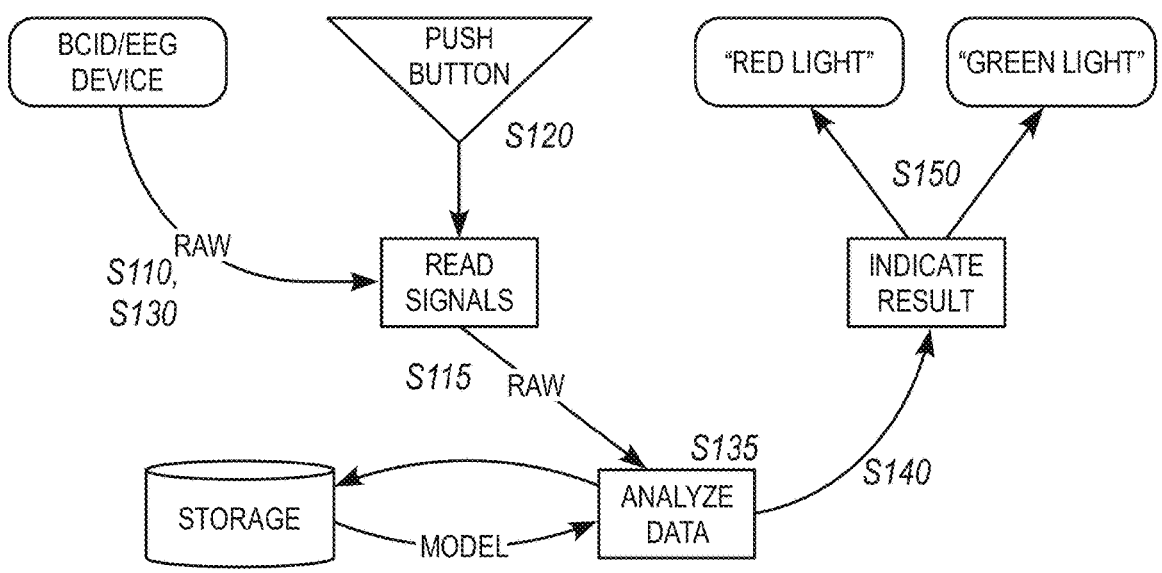
Figure 2A:
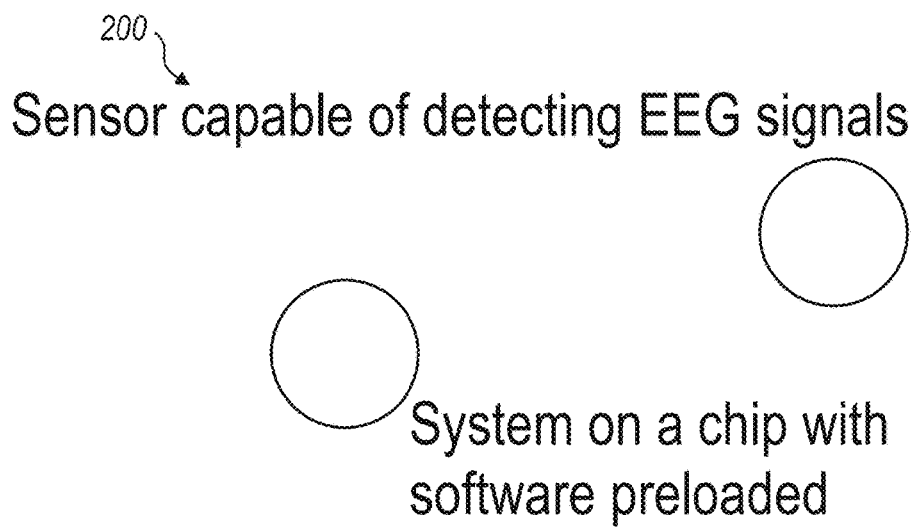
FIGS. 2A-2B depict embodiments of a system for providing a brain computer interface.
Figure 2B:
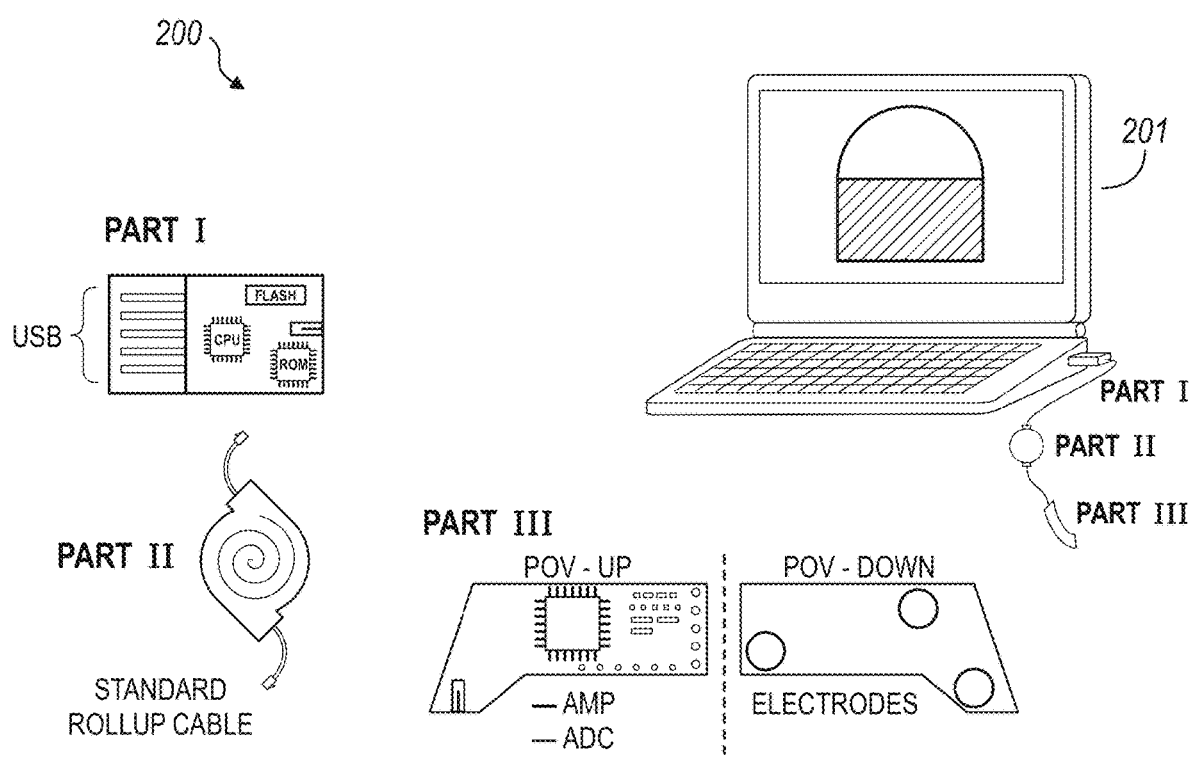
Figure 3A:
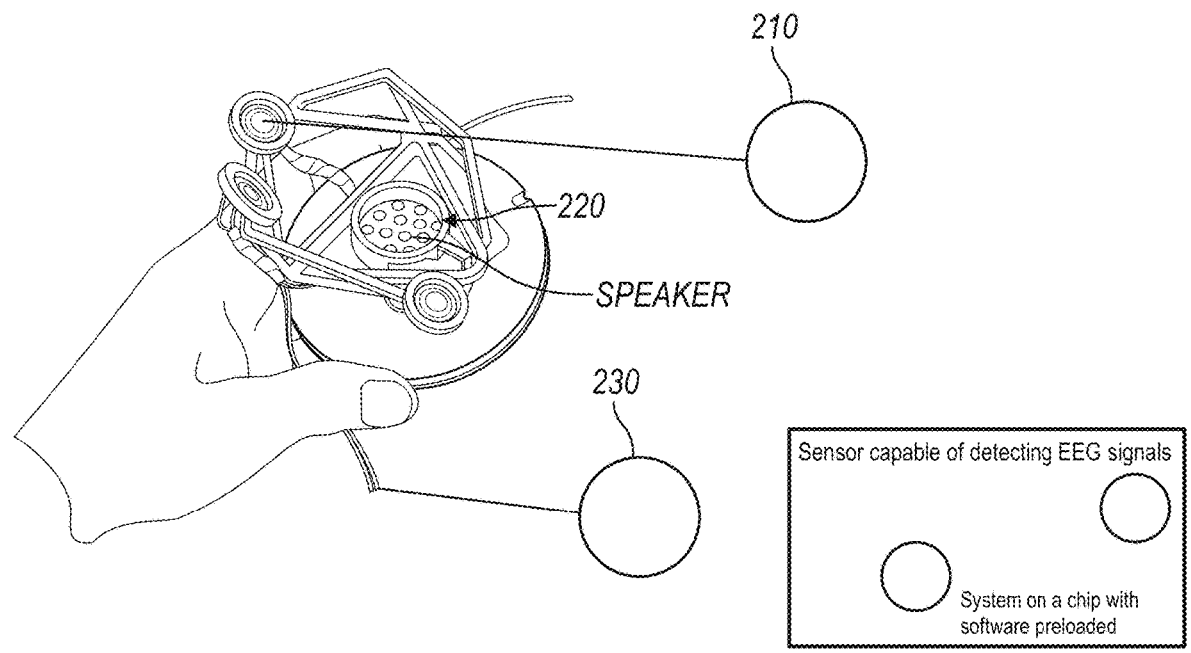
FIGS. 3A-3B depict an example of an ear-coupled system for providing a brain computer interface.
Figure 3B:
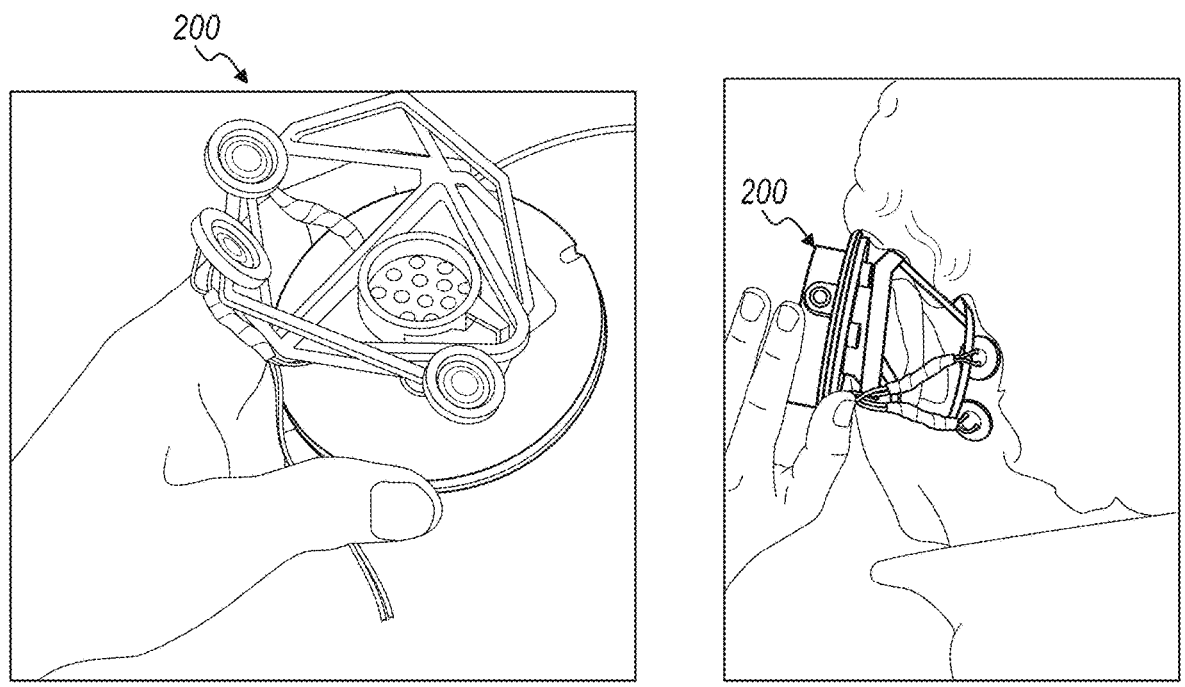
Figure 4A:
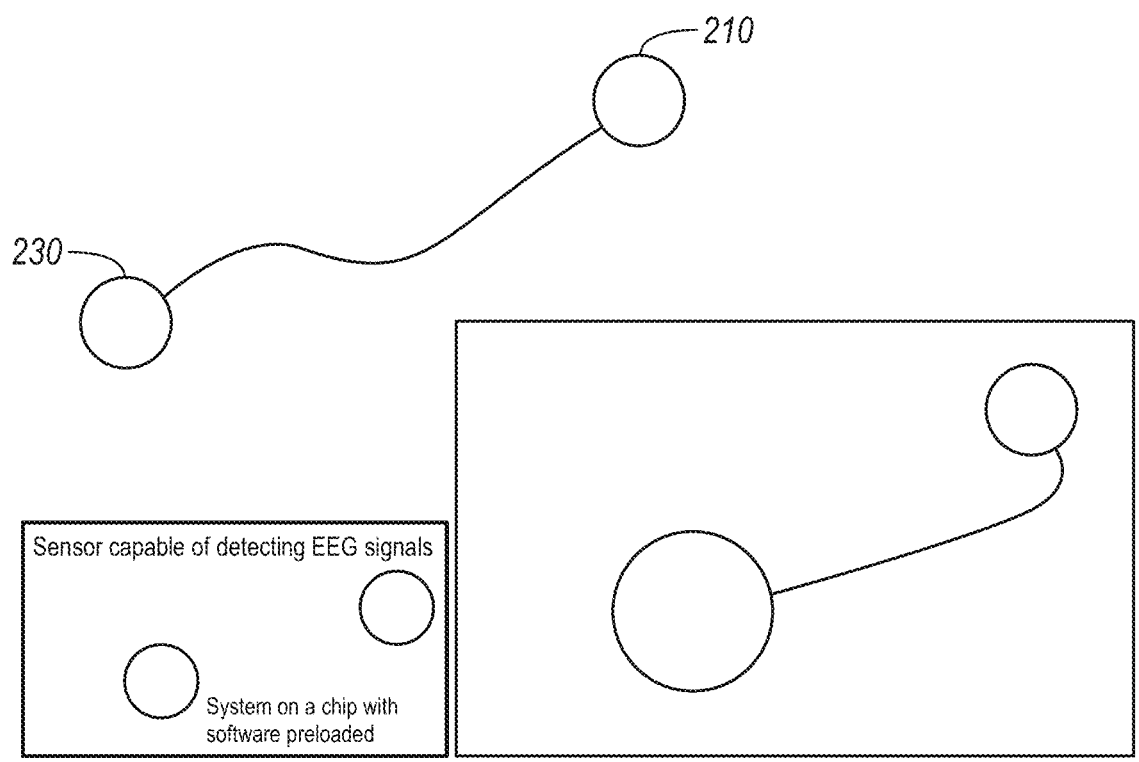
FIGS. 4A-4B depict components of a variation of a system for providing a brain computer interface.
Figure 4B:
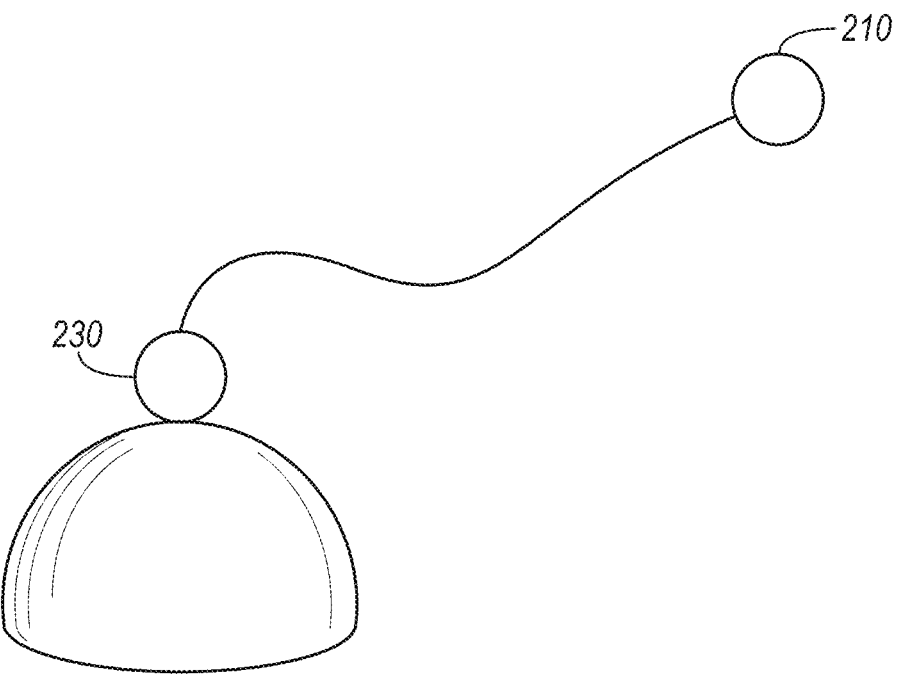
Figure 5:
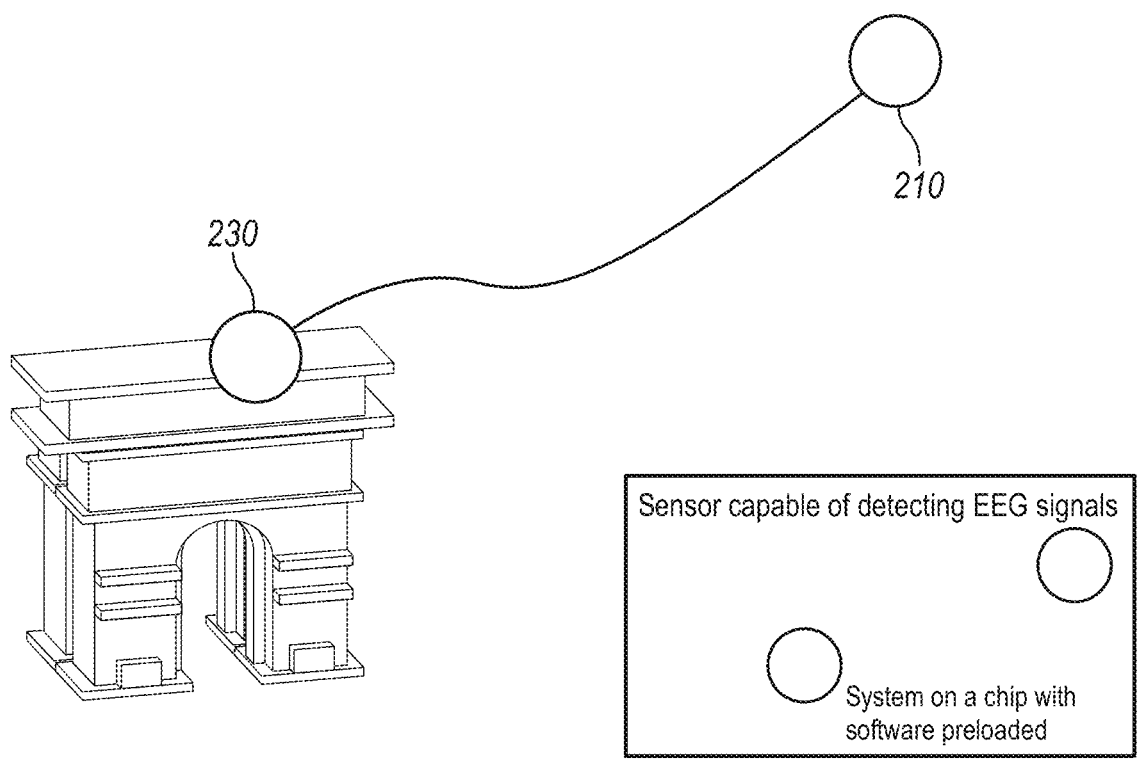
FIG. 5 depicts a specific use case of a system for providing a brain computer interface.

As shown in FIGS. 1A-1C, a method 100 for providing a brain computer interface includes: within a first time window, collecting a first neural signal of a user in response to a calibration session having at least one of a first time-locked component and a first spontaneous component S110; generating a user-specific calibration model based on the first neural signal S115; prompting the user to undergo a verification session within a second time window S120; collecting a second neural signal contemporaneously with delivery of the verification session S130; generating an output of the user-specific calibration model from the second neural signal S135; based upon a comparison operation between processed outputs of the second neural signal with the output of the user-specific calibration model, determining an authentication status of the user S140; and based upon the authentication status, performing an authenticated action S150.

Figure 10A:
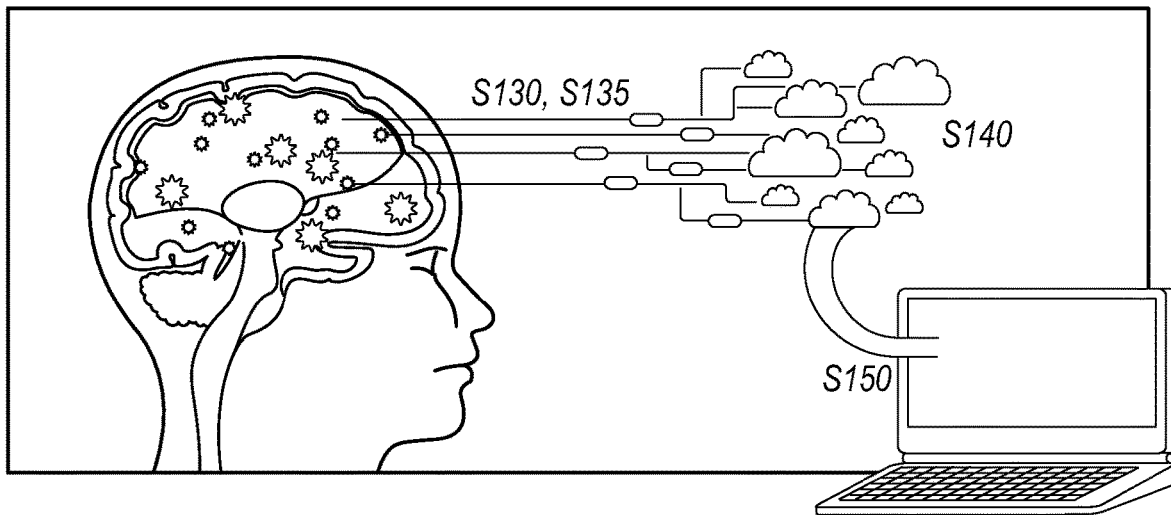
FIGS. 10A-10C depict flowchart representations of variations of the method for providing a brain computer interface.
Figure 10B:
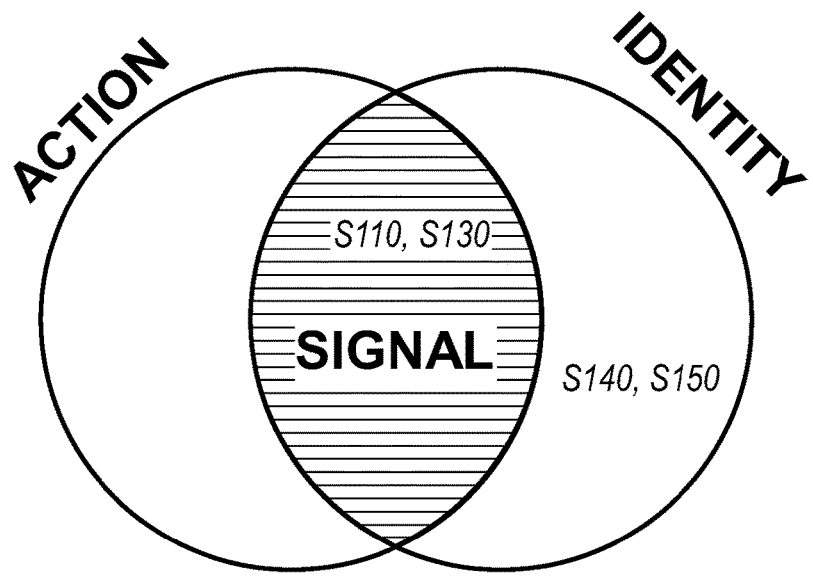
Figure 10C:
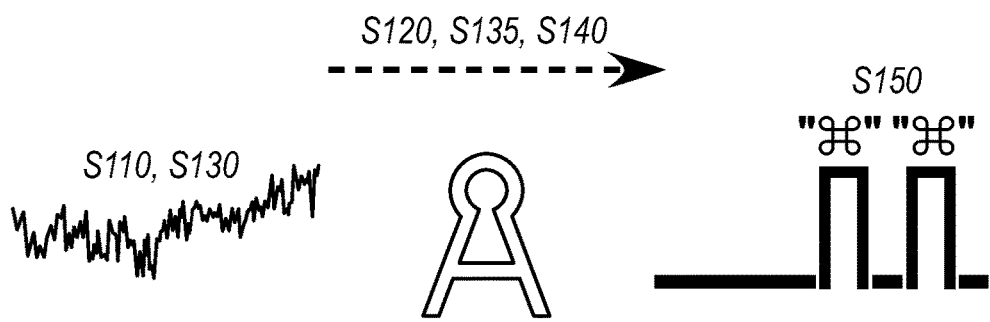

The method 100 functions to provide a data transfer, control, and general interface between the brain of a user and a computing system, as shown by way of example in FIG. 10A. The method 100 can also function to implement a neural signal analysis system for cybersecurity and other solutions (e.g., accessing of a universe of electronic/digital content, receiving assistance from a digital assistant, etc.), and in specific embodiments, the invention(s) described herein provide systems, methods and protocols for evaluating and inferring user identity and brain-derived action information from measurement and analysis of brain activity, as shown by way of example in FIGS. 10B and 10C. The present invention relates both to systems for calibrating neural signal parameters that characterize and distinguish individuals and groups of individuals, as well as authorization and permissions granting software systems based on neural signal evaluations. As defined and combined in the present invention, these novel systems and methods can thus have utility within a wide range of applications and environments.

Figure 11:
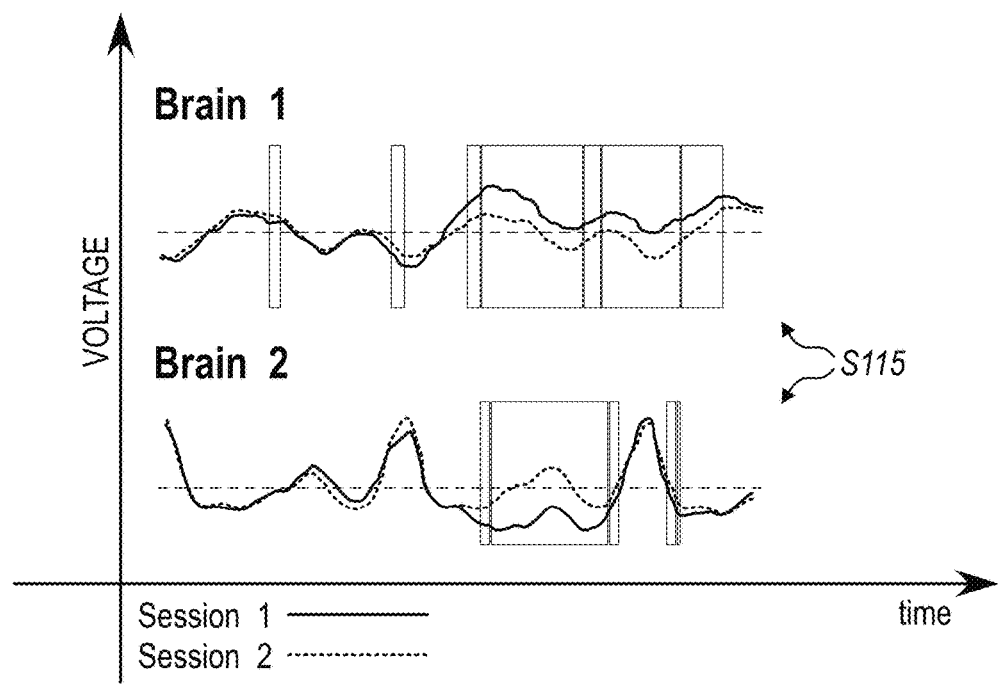
FIG. 11 depicts example neural signal patterns associated with generating a user-specific calibration model and authenticating a user based on neural signals and the user-specific calibration model.
Figure 12:
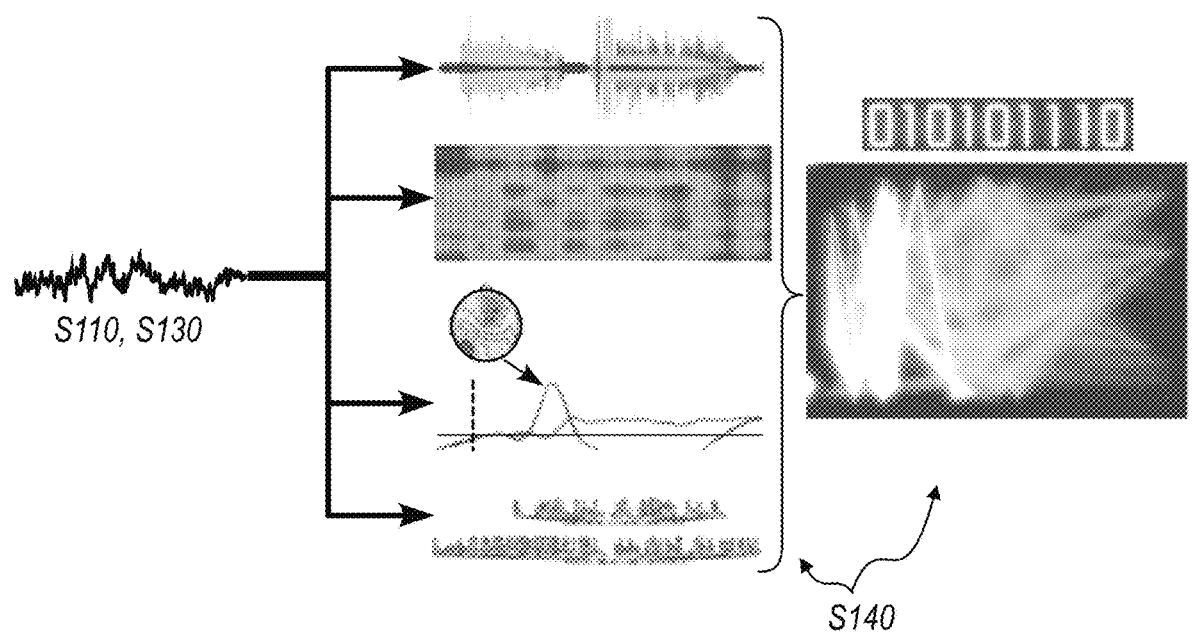
FIG. 12 depicts an example data flow in a method for providing a brain computer interface.

In more detail, the method 100 can receive signals from users and implement algorithms configured to classify brain activity, such that neural signals can be used as a single-factor of authentication and/or integrated into a broader multi-factor authentication platform. As shown by way of example in FIG. 11, signals for different users can have variant and invariant features, wherein the variant and/or invariant features for a given user can vary between users. Thus, the method(s) described herein can be used to comprehend idiosyncratic and highly variable features of brain activity (e.g., as depicted in FIG. 12) and use these features as inputs into a sorting and separating system that verifies user identities with higher confidence than existing solutions. In relation to the method 100, other factors of a multi-factor authentication platform can include one or more of: alphanumeric password inputs (e.g., characters, etc.), tokens, fingerprint inputs (e.g., fingerprint profiles and characteristics), hand inputs (e.g., handprint profiles and characteristics), peripheral perfusion measurement-related inputs, iris pattern inputs (e.g., iris characteristics, etc.), facial features, vocal features, gait-based features, other biometric features, keystrokes, computer usage logs, inputs to digital objects, and/or other current or future conceivable identifying observations.

Figure 9A:
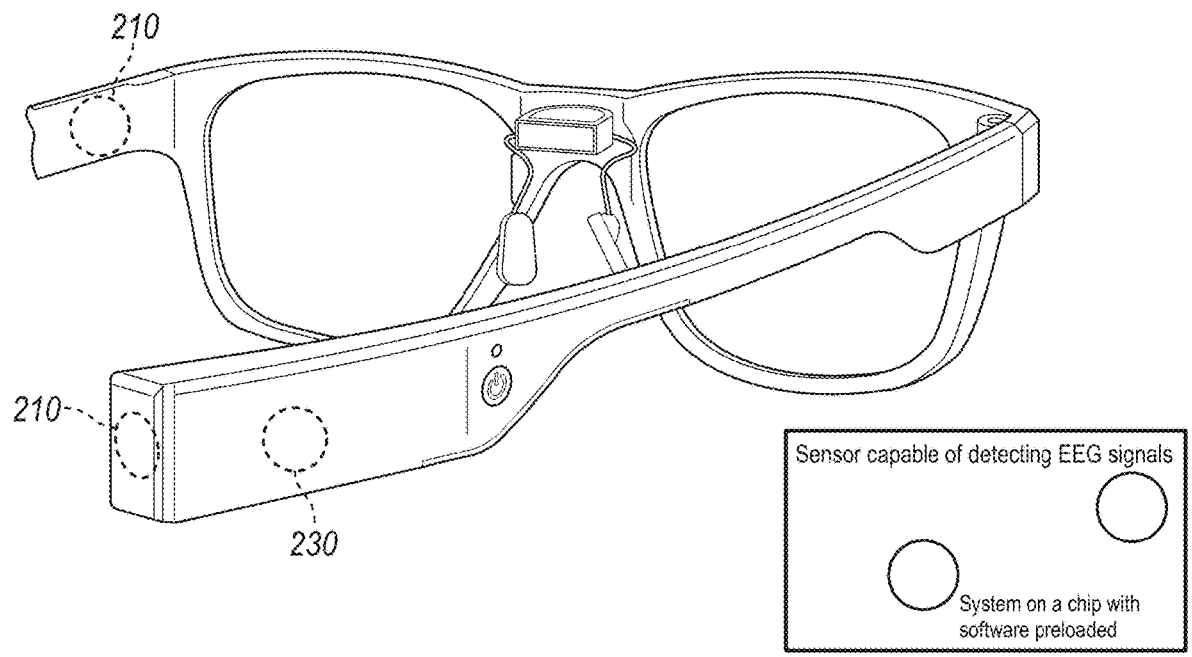
FIGS. 9A-9B depict variations of an eyewear system for providing a brain computer interface.
Figure 9B:
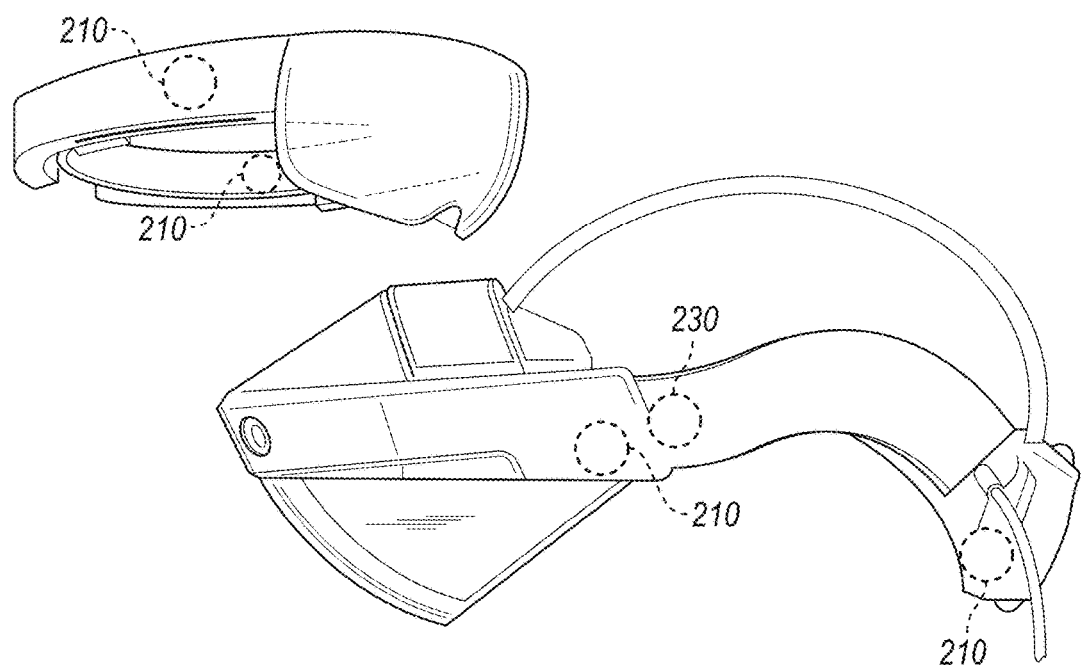

The method 100 can be implemented, at least in part, using a brain-computer interface (BCI) device 200 in order to provide a brain-computer interface-based identity verification technology that serves to authenticate users by evaluating their brain activity. As shown in FIGS. 2A-2B, 3A-3B, 7A-7D, and 9A-9B, the BCI can have at least one of the following form factors: headset, head-mounted wearable device, earphone, ear-mounted wearable device, face-coupled wearable device, local environment device (e.g., room with magnetic coils that can detect electromagnetic activity from the user's head), and any other suitable device capable of generating a brain-computer interface. In variations, as shown in FIGS. 3A-3B and 7A-7D, the BCI can have an ear-coupled form factor, and in other variations, as shown in FIGS. 9A-9B, the BCI can have an eyewear form factor. However, in still other variations, the BCI can have a combined factor with ear-coupled and eyeworn aspects, and/or any other suitable form factor.

The BCI can interface with a peripheral device 201 (e.g., a USB-connected device, a Bluetooth-connected device populated with the user-specific calibration model(s) and configured to output commands), as shown in FIGS. 2A-2B, 4A-4B, 5, and 6, to affect device states of devices associated with the users interacting with the method 100.

Furthermore, the BCI/peripheral device can comprise or otherwise communicate with a computing system including at least one of the following: a computer or processor non-transitory readable medium, a computer or processor non-transitory storage medium (e.g., memory, disk drive, flash memory) configured to encode and/or store instructions (i.e., computer-executable instructions associated with one or more portions of the methods described).

Additionally or alternatively, portions of the system can include or cooperate with one or more of: sensors 210, sensory stimuli delivery systems 220 (e.g., audio stimulus provision systems as shown in FIGS. 3A-3B and 7A-7D, video stimulus provision systems as shown in FIGS. 9A-9B, tactile stimulus provision systems, olfactory stimulus provision systems, taste sensation stimulus provision systems), and associated embedded software (or firmware) modules, algorithms, and/or procedures 230.

As such the system elements and/or methods developed can cooperate as a processing pipeline configured to detect brain activity, extract activity features and characteristics unique and informative about each user, define a model of each user (e.g., in a population-wide manner, in a user-specific manner), refine the model(s) such that each unique user has a distinct and highly differentiable profile, and then compare future identity claims against said model. System elements and/or methods can then be operable to allow users to interact with their environments and/or digital content in an enhanced manner. As such, the system components, in combination with novel algorithms implemented in software, can operate as one or more of: a neural signal scanner, a neurobiometric signature module, a neural ink decoder (e.g., as in watermarking, whereby brain activity can be encrypted and/or decoded upon command), an electrophysiological wave assessment engine, an electrophysiological identifier, a biomagnetic signature analyzer, a thought-print scanner, a personal identifying physiological numerics generator, and an archetypal topology analyzer.

2. Benefits

The method and/or related systems, and variants thereof, can confer several benefits and/or advantages.

First, variants of the method can enable metadata extraction from the real world via monitoring of neural signals, and executing actions based on the extracted metadata. For example, a user can walk in a garden and imagine conjuring up information about each of the plants. Information provided to the user can be increasingly detailed until the user provides a neural signal-based input (e.g., imagining a "pause", imagining a spreadsheet), upon which data associated with the information is migrated to an electronic document (e.g., a spreadsheet) that the user can view at a later time. In another example, a user can gaze at a physical product in a grocery store, and imagine purchasing the physical product, and in response a digital indicator of the physical product can be added to a virtual shopping cart associated with the user. In another example, a user can interact with a physical object in the real world, and a digital object can be manipulated in a virtual world (e.g., with a head-coupled wearable display) in response to monitoring the neural signals associated with the user's interaction with the physical object.

Figure 13A:
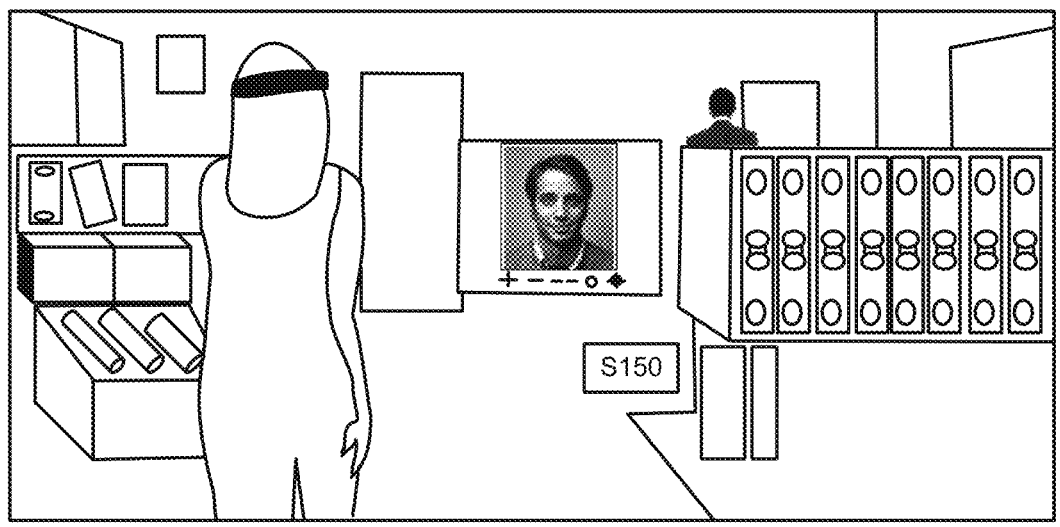
FIGS. 13A-13B depict exemplary authenticated actions of a method for providing a brain computer interface.

Second, variants of the method can enable iterative improvement of mental-physical data links. For example, a user can interact with a physical object in the real world, and a digital object can be manipulated in a virtual world in response to monitoring the neural signals associated with the user's interaction with the physical object, and the user's mental response to the manipulation of the digital object can be monitored in order to evaluate the quality of the digital representation (e.g., a user's mental state can be evaluated as being satisfied or dissatisfied with the virtual representation). The feedback loop between the user's physical behaviors, the virtual representations of the user's physical behaviors, and the user's mental response to the virtual representations can be iteratively repeated in order to improve the virtual representations of the user's physical behaviors (e.g., until a state of user delight and/or satisfaction is consistently determined). In one example, as shown in FIG. 13A, a user wearing an augmented reality headset can automatically initiate a video call with an entity by imagining the need to speak with the entity, according to a user-specific model of neural signatures associated with speaking with a desired entity.

Figure 13B:
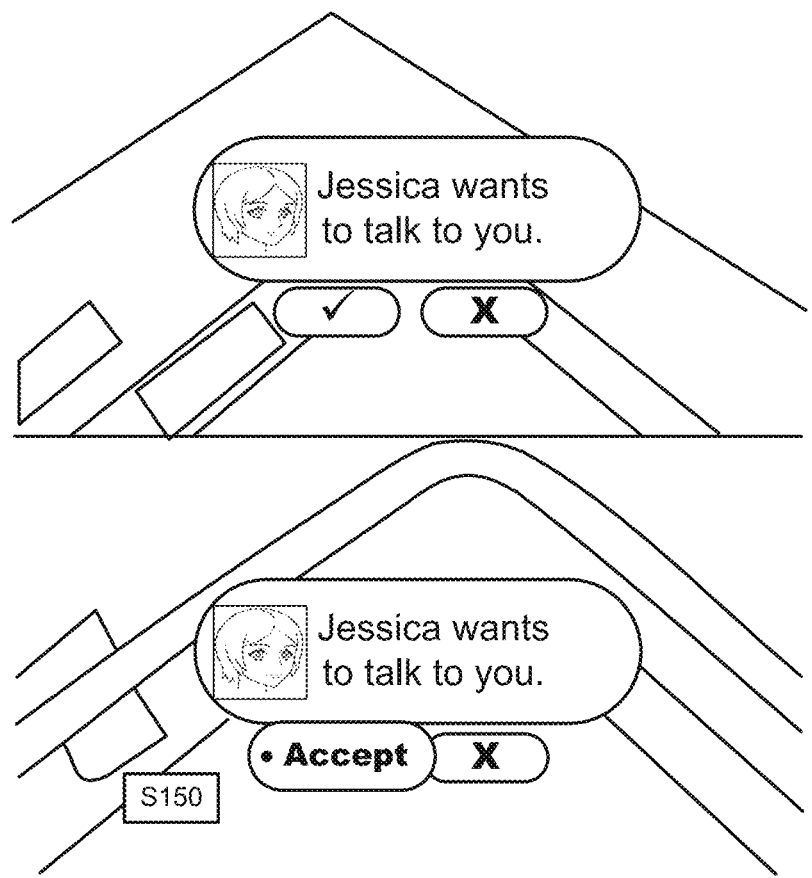

Third, variants of the method can enable monitoring of user desires and acting upon such desires without relying upon externally observable user actions (e.g., gestures, eye movements, etc.) because the method includes monitoring an internal mental state of the user via neural signals. The user's brain itself can provide instructions and/or indications of user desires (e.g., via the motor cortex, visual cortex, speech center, etc.) without an action being expressly and/or physically performed. For example, a selection box can be selected by a user via the brain computer interface, as depicted in FIG. 13B.

Fourth, variants of the method can improve the performance of specialized and non-specialized hardware. For example, variants of the method can enable a user to unlock their mobile device via a brain computer interface by authenticating the user identity and unlocking the device in response. In this example, the user can more rapidly and efficiently utilize their mobile device while maintaining secure safeguards against unauthorized access. In another example, the performance of brain computer interface devices can be improved by generating a user-specific calibration model, that accounts for differences between users that can otherwise reduce the efficacy of brain computer interface devices.

Fifth, variants of the method can solve problems rooted in computer and machine technology. For example, the method can enable the deconvolution of variant and invariant features present within neural signals. The invariant features can be used to determine an authentication status of the user, while the variant features can be decrypted via some implementations of the method to determine user emotional state(s), intentions, desires, and the like. Thus, variants of the method can solve the problem of simultaneous authentication and neural signal assessment of a user, which is a problem rooted in computer and machine technology.

However, the methods and/or systems herein can confer any other suitable benefits and/or advantages.

3.1 Method—Calibration

Block S110 includes: within a first time window, performing a calibration operation with a neural calibration signal dataset from a user, the neural calibration signal dataset received in response to a session having a time-locked component and a spontaneous component. Block S110 functions to record and process data in a single or a variety of environments, in order to calibrate a user-specific model of brain activity that can be use for user identity verification. The user-specific model can be used to make inferences on new brain activity signal samples (from the user or from other users). The user specific model can additionally or alternatively be used a source of information for grouping individuals, characterizing personality traits, and/or any other suitable purpose.

Block S110 preferably comprises receiving bioelectrical signals indicative of brain activity of the user(s), wherein the bioelectrical signals include electroencephalogram (EEG) signals collected using a suitable BCI coupled to the user during the calibration session. However, the bioelectrical signals (or other signals received in Block S110 and S130) can additionally or alternatively include any one of more of: magnetoencephalography (MEG), impedance signals, galvanic skin response (GSR) signals, electrocardiography (ECG) signals, heart rate variability (HRV) signals, electrooculography (EOG) signals, electromyography (EMG) signals, and/or any signals that can be indicative of brain activity or supplement protocols for user verification using brain activity-derived signals. Furthermore, Block S110 can additionally or alternatively comprise collecting other biosignal data obtained from or related to biological tissue or biological processes of the user, as well as the environment of the user.

Block S110 can be implemented in real and/or simulated physical environments (e.g., using virtual reality devices). In one variation, Block S110 can include receiving signals in a physical or simulated environment (e.g., office, room, parking lot, server room, combat zone, daycare, machine shop, test facility, etc.) associated with the use case of the authentication/authorization system. The real and/or simulated environments can have any suitable noise factor associated with them, in relation to electrical noise, auditory noise, and/or any other suitable type of noise associated with signal acquisition, such that the calibration model(s) generated and validated in Block S110 are substantially adaptive/invariant, robust, and functional in different environments with different noise profiles or other profiles.

Similarly, Block S110 can be implemented in association with different mental state-associated environments. In variations, such mental states of the user(s) can be associated with one or more of: a mental state associated with focus (e.g., a focused mental state, a distracted mental state), an emotional/affective state (e.g., a happy state, a sad state, a frightened state, a relaxed state, an angry state, etc.), a cognitive state (e.g., a state of high cognitive load, a state of low cognitive load, etc.), and/or any other suitable mental state. Thus, in generating calibration models in different mental environments, the calibration model(s) generated and validated in Block S110 can be substantially adaptive/invariant, robust, and functional in relation to different user mental states.

Calibration can, however, be performed in a manner that accounts for a wide variety of other variables, in order to generate substantially adaptive/invariant, robust, and functional user models. For instance, signal acquisition in Block S110 can be conducted in relation to different physiological states of the user (e.g., a metabolic state of the user, a sleep state of the user, a state of the user associated with cardiovascular system stress, a state of the user associated with another physiological state, etc.). Additionally or alternatively, signal acquisition in Block S110 can be conducted in relation to different environmental conditions (e.g., related to sensors of BCIs used). Such environmental conditions can include one or more of: different environmental temperature states, different environmental pressure states, different environmental humidity states, and/or any other suitable environmental state that could have an effect on sensor performance and/or performance of any other suitable hardware component associated with the system(s) implementing the method(s) described.

Furthermore, in relation to signal acquisition in different environments/states, such environments can be specifically designed/contrived and delivered during the calibration session of Block S130, or can alternatively be responded to spontaneously during calibration, with conditions of the various environments/states documented during signal collection.

The calibration operation of Block S110 can be conducted once, or can alternatively be repeated. In variations wherein the calibration operation is repeated, repetition can be conducted any suitable number of times, at any suitable frequency, in relation to specific triggering events (e.g., times of day, triggering by a user, triggering by a manager of the system, triggering by an operator of the system, triggering in response to an environmental event, etc.). In a specific example, the calibration operation can be conducted whenever a user desires the system to learn a model for a specific mental phenomenon of the user, such that the calibration operation is conducted whenever the specific mental phenomenon of the user occurs.

As noted earlier, the calibration session of Block S110 can have a time-locked component, wherein time-locked signals are collected in response to provided stimuli. Preferably, the time-locked component of the calibration session includes a stimulus provided to the user within a time window (e.g., a series of time points within a time window, a single time point within a time window, continuously within a time window, etc.) and signals acquired in relation to the time-locked component are temporally synchronized (e.g., locked relative to the neural signals). Alternatively, the time-locked component can have any suitable temporal characteristics in relation to the signal acquisition (e.g., asynchronous, delayed by a predetermined time shift, etc.). In variations, the stimuli of the time-locked component can include one or more of: an auditory stimulus (e.g., audio stimulus) provided by an audio output device (e.g., an audio output device integrated with or in communication with an EEG signal acquisition system and/or other sensor system); a visual stimulus provided by a display (e.g., a display integrated with or in communication with an EEG signal acquisition system and/or other sensor system); a tactile stimulus provided by a tactile object/haptic system; an olfactory stimulus; a taste sensation stimulus, and any other suitable stimulus. In a specific example, the stimulus of the time-locked component can include an audio stimulus (e.g., a music sample, a speech sample, a cacophonous sound sample, etc.). Additionally or alternatively, in another specific example, the stimulus of the time-locked component can include a visual stimulus (e.g., a series of images, a video, etc.).

Time-locked components of the calibration session can have a randomized factor occupying any desired portion of the time-locked stimuli (e.g., a predetermined fraction). In more detail, the randomized factor can contribute to decoupling of environmental factors and mental factors associated with generation of the user profile. In specific examples, the randomized factor can occupy between 1% and 50% of a stimulus; however, in variations of the specific example, the randomized factor can occupy any other suitable portion of a stimulus (e.g., between 0% and 100%). In an example, an audio stimulus can be an audio sample including between 5% and 30% randomization factor (in comparison to an un-modified version of the audio sample). In another example, a readable stimulus can be a written sample including between 5% and 30% randomization factor (in comparison to an un-modified version of the written sample). For instance, an unmodified written sample can state: "The man unlocked his front door", and the randomized version can state: "The man unlocked his elephant". Responses to the randomized versions/portions of a stimulus and responses to the un-modified stimulus can then be processed to extract features, which can be analyzed in relation to brain activity signatures used in other blocks of the method 100.

As noted earlier, the calibration session of Block S110 can have a spontaneous component, wherein signals are collected in response to a free-form event. In specific examples, the free-form event can include imagined audio (e.g., audio stimuli imagined by the user, such that the spontaneous component includes a session where the user imagines listening to a specific audio sample), imagined smells (e.g., olfactory stimuli imagined by the user, such that the spontaneous component includes a session where the user imagines smelling a smell), imagined taste (e.g., taste stimuli imagined by the user, such that the spontaneous component includes a session where the user imagines tasting a specific consumable), memories of the user (e.g., such that the spontaneous component includes prompting the user to recall a memory), and/or any other suitable free-form event.

Furthermore, the calibration session can be conducted with the user being aware that calibration is occurring, or can alternatively be conducted without the user's awareness. For instance, visual stimuli can be provided subconsciously (e.g., images spliced between video frames), and/or audio stimuli can be provided subconsciously (e.g., at frequencies outside of perceptible ranges, etc.), and/or data can be analyzed retroactively (e.g., post-hoc), such that a new model is calibrated based on data that was obtained outside of a calibration session that the user was aware of. However, prompting and signal acquisition can be performed in the calibration session in any other suitable manner.

While variations of Block S110 including both a time-locked component and a spontaneous component are described above, variations of Block S110 can alternatively omit sessions having a time-locked component or omit sessions having a spontaneous component.

In a specific example of Block S110, the spontaneous component includes a session where the user imagines a stimulus (e.g., a pinprick, a handshake with a specific person, a feeling of falling, etc.) and collecting signals in response to the user imagining the stimulus. In a related example, the spontaneous component can include a session where the user freely imagines a pinprick (or other stimulus), and then at a later point, logs that they imagined the pin prick (or other stimulus) at an earlier time point. However, variations of the spontaneous component can be configured in any other suitable manner.

Furthermore, in relation to calibration, the calibration process can be governed by a desired scope of analysis and any other suitable boundary conditions, such that unintended use of the system can be prevented. For instance in a specific application of governmental use, evaluations of an individual's identity can be performed, without going deeper into assessments of brain health (i.e., in a manner that compromises health-related privacy acts). Furthermore, such calibration models can be encrypted according to industry-accepted protocols and/or made anonymous with private and secure storage means.

3.1.1 Calibration—Model Generation

The method preferably includes Block S115, which includes: generating a user-specific calibration model based on the first neural signal. Block S115 functions to generate a calibration model of the user(s) assessed, in relation to received signals (e.g., EEG signals, signals reflecting brain activity or other activity) in response to time-locked stimuli and/or spontaneous or free-form events.

Generating calibration models can implement machine learning (ML) algorithms configured to generate user-specific and/or population-wide models from training data received in Block S110, and more specifically, to fuse data features and trained classifiers by coding for specific fusions, as well as by using automated combinatorial techniques. In one variation, generating calibration models in Block S110 can implement a support vector machine (SVM) classifier trained on specific data features (e.g., invariant features, variant features) derived from neural signals (and other data) received in the calibration operation of Block S110. In another variation, received data can thus be processed to be comprehended and applied in specific settings, by using features as inputs into one or more artificial neural networks, natural neural networks, and/or other deep learning architectures/learning systems (e.g., nonlinear learning systems). Then, metaheuristic algorithms can be applied to the outputs to generate even more precise, reliable, and robust models for those specific settings. However, the calibration models can be generated and/or refined in any other suitable manner.

In variations, metaheuristic algorithms applied at this stage can be classified according to one or more of the following: a local search strategy, a global search strategy, a single-solution approach, a population-based approach, a hybridization algorithm approach, a memetic algorithm approach, a parallel metaheuristic approach, a nature-inspired metaheuristic approach, and any other suitable approach. In a specific example, a metaheuristic algorithm applied to the received calibration data can comprise a genetic algorithm (e.g., a genetic adaptive algorithm); however, any other suitable approach can be used. Additionally or alternatively, non-metaheuristic algorithms (e.g., optimization algorithms, iterative methods), can be used.

In relation to generating calibration models in Block S110, fused data can comprise data derived from user brain activity, and data from other sources (e.g., non-brain-derived sources, auxiliary biometric signals, auxiliary data, etc.).

In variations, brain activity-derived features used to generate models can be derived from one or more of: event-related potential data (e.g., voltage-over-time values, etc.); resting state/spontaneous activity data (e.g., voltage-over-time values, etc.); responses to different events (e.g., differences between event-related potentials acquired in response to different events in type, timing, category, etc.); subdivided (e.g., stochastically, systematically, etc.) time-domain signals into numerous atomic units that represent features on different time scales (e.g., subseconds, seconds, minutes, hours, days, months, years, super years, etc.); spectrum aspects (e.g., minima, maxima, positive peaks, negative peaks, time points associated with polarity or other peaks, amplitudes of peaks, arithmetic relationships computed on peaks, etc.); similarity measures (e.g., cosine similarity, various kernels, etc.) between a defined "max-min spectrum" and a pre-computed template; similarity measures between various equivalent atomic units of the raw time domain signals; similarity measures applied to combinations of features; measures derived from clustering of features (e.g., soft/fuzzy clustering, hard clustering); filtered signals (e.g., signals filtered adaptively based on second-order parameters, signals filtered into discrete frequency bands, with computation of variances/autocorrelations in each band, with cross-correlations/covariances across bands); distance metrics (e.g., Riemannian distances) between select matrices; iterative matrix manipulation-derived features (e.g., using Riemannian geometry); entropy measurements within features, between features, and between different user's entire feature sets; subspace analyses (e.g., stationary subspace analyses that demix a signal into stationary and non-stationary sources); recurrence quantification analyses of various time segments; recurrence plots processed through convolutional neural networks that extract additional features (e.g., shapes, edges, corners, textures); principal component analysis-derived features; independent component analysis-derived features; factor analysis-derived features; empirical mode decomposition-derived features; principal geodesic analysis-derived features; sequence probability-derived features (e.g., through hidden Markov models, through application of a Viterbi algorithm, through comparison of probable paths to templates, etc.); single channel duplication-derived features (e.g., with or without imposition of different distortions to duplicates); invariant features, variable features, and any other suitable brain activity-derived feature.

In variations, non-brain activity-derived features can be derived from one or more of: personal information (e.g., user name, user identification code, date of birth, location, relationships, family history, religion, etc.); physical attributes (e.g., height, weight, eye color, hair color, ethnicity, shoe size, etc.); biometric identifiers (e.g., fingerprints, iris scan data, hand scan data, palm prints, voice signatures, epidermal characteristics, odor, genomic information, blood type, endophenotype information, phenotype information, genotype information, etc.); biometric data derived from other sensors (e.g., electroencephalography data, electrocardiogram data, electrodermal response data, blood pulse-derived data, near-infrared spectroscopy data, electromyogram data, pupilometry data, hemoencephalography data, heart rate derived data, galvanic skin response data, electrooculography data, etc.), data derived from other sensors/emitters (e.g., gyroscope data, camera data, microphone data, wifi broadcast data, radio broadcast data, Bluetooth data, GPS data, RFID data, access control log data, elevator log data, etc.); user behaviors in interactions with devices (e.g., keystrokes, mouse dynamics, touch pad dynamics, joystick dynamics, reaction times, etc.); user survey-derived data; environmental information (e.g., raw/processed data derived from computer vision-based logs of surrounding environments); data derived from projections delivered in an augmented reality or virtual reality scene (e.g., timing, type, location, attributes, etc.); data derived from user devices (e.g., application-derived information, digital service-derived information, device state information, device sensor-derived information); data from social networking applications; data from productivity applications (e.g., emails, calendar appointments, notes, etc.); data from other users; data from institutions (e.g., banks, hospitals, governments, schools, businesses); network-derived data (e.g., traffic properties, firewall logs, file metadata, internal server communication with other servers, mail room activity logs, port openings, port closings, timing correlation with user IPs, user search terms, etc.); and any other suitable data.

While variations of algorithms are described above, the calibrations models generated in Block S110 can additionally or alternatively be based upon algorithms characterized by a learning style including any one or more of: supervised learning (e.g., using logistic regression, using back propagation neural networks), unsupervised learning (e.g., using an a priori algorithm, using K-means clustering), semi-supervised learning, reinforcement learning (e.g., using a Q-learning algorithm, using temporal difference learning), and any other suitable learning style. Furthermore, the machine learning algorithm can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Laplacian eigenmapping, isomapping, wavelet thresholding, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm.

3.2 Method—User Prompting and Signal Collection

Block S120 includes: prompting the user to undergo a verification session within a second time window, which functions to assess the identity of a user at a subsequent time point. Prompting preferably includes prompting users with short duration exercises (e.g., under a minute long in duration), but can alternatively include prompting users with any exercise duration. Similar to previous blocks, prompting can be performed with or without the user's perception of a prompt.

Prompting in Block S120 is preferably implemented at an electronic prompting device associated with the system 100, wherein the prompting device is further associated with the specific application of use. In variations, prompting can occur within an application installed on a computing device, within an application executing on a mobile computing device, within an application executing on a wearable computing device (e.g., head-mounted wearable computing device, wrist coupled wearable computing device, etc.), within a website, and/or within any other suitable electronic environment. Prompting in Block S120 can be performed one or more of: visually, audibly, haptically, and in any other suitable manner. Prompting can be performed perceptibly (e.g., via engaging with the user) or imperceptibly (e.g., stimuli can be provided that are outside the range of consciously perceptible stimuli). Furthermore, variations of prompting in Block S120 can be performed without a device prompt, and instead rely upon human instruction in order to prompt the user.

Similar to Block S110, prompting in Block S120 can occur at any suitable frequency and/or in response to any suitable triggering event. As such, in variations, prompting can be performed in Block S110 whenever a user needs to be authenticated or authorized for a specific application of use. Additionally or alternatively, in variations, prompting can occur regularly or irregularly at any frequency (e.g., in relation to re-authorization, re-authentication) multiple times. Additionally or alternatively, in variations, prompting can occur in relation to a triggering event (e.g., a period of inactivity, an attempt to access another location, an attempt to access another piece of content, etc.).

The exercises associated with prompting in Block S120 are preferably associated with exercises of the calibration session of S110, but can include any combination or subset thereof. For instance, in some variations, Block S120 can include prompting with a combination of time-locked components and/or spontaneous components. Alternatively, Block S120 can include prompting with only time-locked components. Still alternatively, Block S120 can include prompting with only spontaneous components. Still alternatively, Block S120 can include prompting with un-modeled exercises, such that brain activity responses to those previously un-modeled exercises can be built into the refined calibration models of Block S110. In a specific example, prompting in Block S120 can comprise a spontaneous session separating two time-locked sessions, each session having a short duration. Furthermore, in relation to the randomization factor described above, any component of the prompt in Block S120 can include an algorithmically-selected randomization factor to promote enhanced security and/or confidence in user identity.

Furthermore, similar to the calibration session(s) of Block S110, prompting in Block S120 can be performed with the user's awareness, or can alternatively be performed in a manner in which the user is unaware.

Block S130 includes: collecting a neural signal dataset in coordination with delivery of the verification session of Block S120, and functions to collect user brain activity (and other) responses that can be tested according to the calibrated models output from Block S110.

Similar to Block S110, Block S130 preferably comprises receiving bioelectrical signals indicative of brain activity of the user(s), wherein the bioelectrical signals include brain signals (e.g., EEG or other signals) collected using a suitable BCI device coupled to the user during the calibration session. However, the bioelectrical signals (or other signals received in Block S110 and S130) can additionally or alternatively include any one of more of: magnetoencephalography (MEG) impedance signals, galvanic skin response (GSR) signals, electrocardiography (ECG) signals, heart rate variability (HRV) signals, electrooculography (EOG) signals, electromyelography (EMG) signals, electromyography signals, and/or any signals that can be indicative brain activity or supplement protocols for user verification using brain activity-derived signals. However, in relation to the non-brain activity derived signals of the calibration model, Block S130 can additionally or alternatively comprise collecting other biosignal data obtained from or related to biological tissue or biological processes of the user, as well as the environment of the user, devices associated with the user, network aspects, and/or any other suitable source.

In relation to the neural signal datasets received in Blocks S110 and S130, any suitable signal processing operations can be performed. For instance, a denoising model can be applied to mitigate or remove effects of user-specific impedances, motor artifacts, environmental artifacts, and/or any other suitable noise. Additionally or alternatively, signal processing can include filtering, smoothing, clipping/winsorizing, deconvolving, standardizing, detrending, resampling, and performing any other suitable data conditioning process upon neural signal data (and/or other data) received in Blocks S110 and S130.

3.3 Method—User Authentication

Block S140 includes: based upon a comparison operation between processed outputs of the second neural signal with processed outputs of the user-specific calibration model, determining an authentication status of the user. Block S140 functions to authenticate a user's identity in a manner of authentication that can be integrated with a multi-factor authentication protocol. Authentication in Block S140 can be used to extract a user-specific model (e.g., of how the user interacts with digital content in relation to neurological signals associated with user behaviors). Authentication in Block S140 can additionally or alternatively be performed as a high security service in an enterprise (e.g., high-security enterprise), which can function as a solution to key management, long passwords, and/or deficient multifactor authentication approaches (e.g., Yubikey). As such, one or more portions of the algorithms associated with the method 100 can be integrated with $3^{rd}$ party service provide software to enable time-specific authentication as described herein.

In Block S140, the authentication status preferably comprises a positive verification of the user's identity, a negative verification of the user's identity, or an indeterminate verification of the user's identity; However, the authentication status can additionally or alternatively include a percent confidence in an analysis of the user's identity and/or any other suitable characterization of the user's identity. Authentication preferably comprises a comparison between a model of signals received during the verification session and the calibration model. Furthermore, authentication preferably accounts for a randomization factor in a time-locked component provided in the prompt of Block S120. Upon performing the authentication process, Block S140 can then include transmitting an authentication certificate to a target (e.g., server, device, etc.), wherein qualities of the authentication certificate trigger or prevent subsequent actions from occurring. However, authentication can be implemented in any other suitable manner in Block S140.

Figure 6:
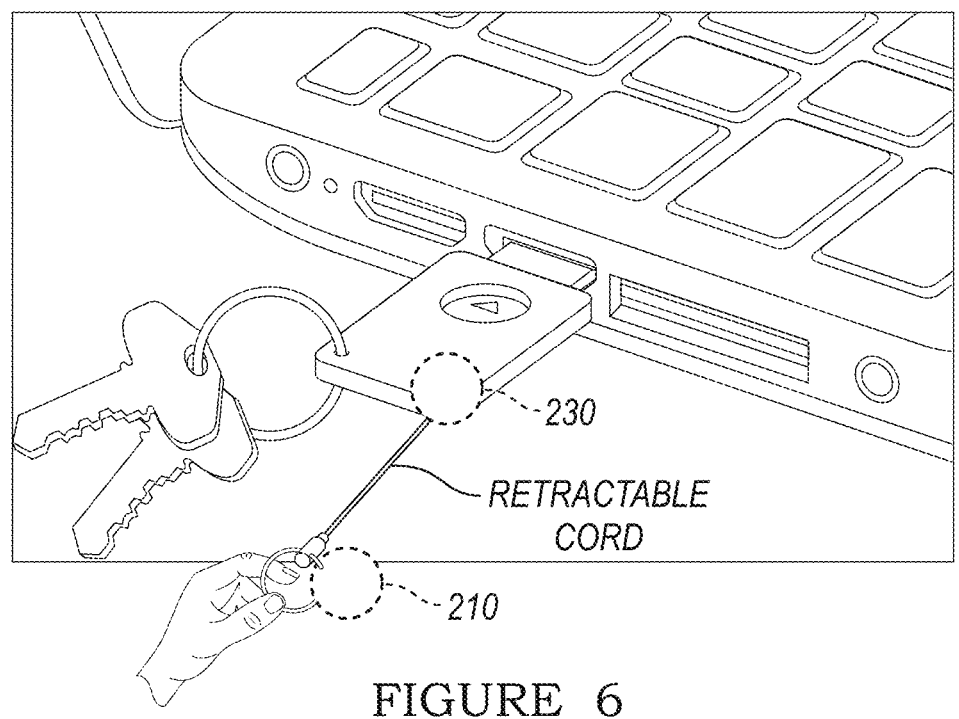
FIG. 6 depicts a variation of a component of a system for providing a brain computer interface.
Figure 7A:
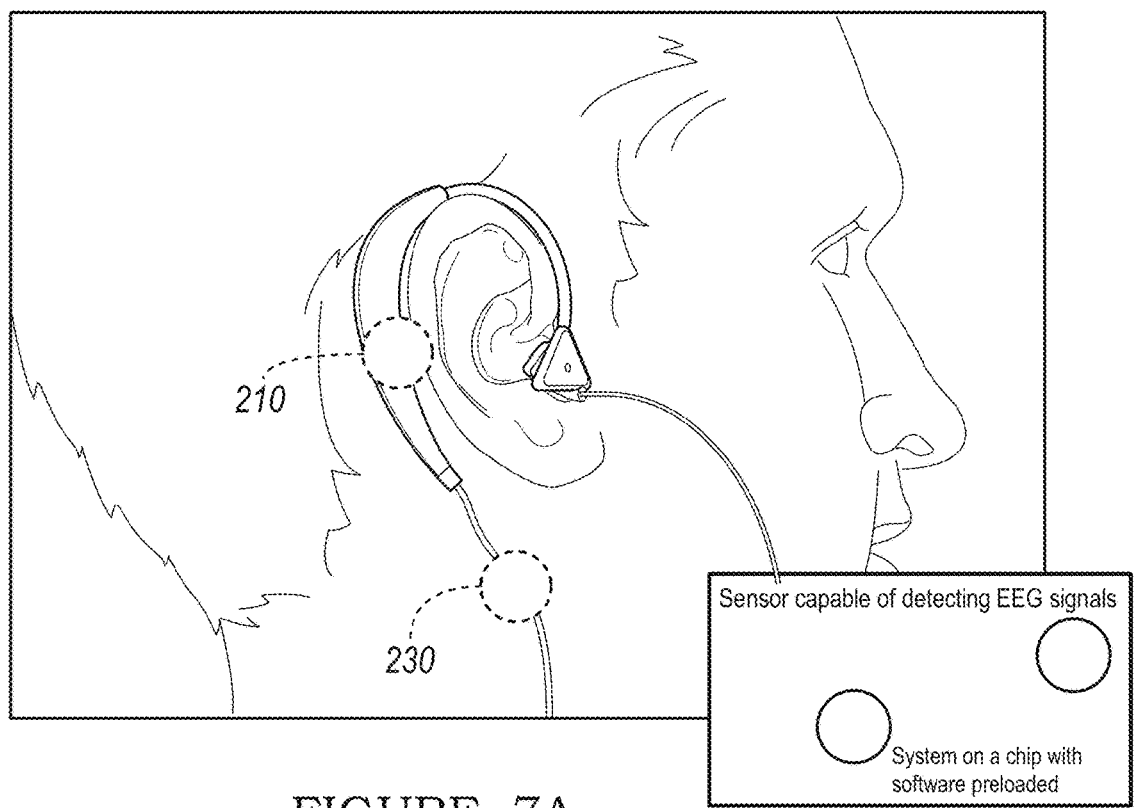
FIGS. 7A-7D depict variations of an ear-coupled system for providing a brain computer interface.
Figure 7B:
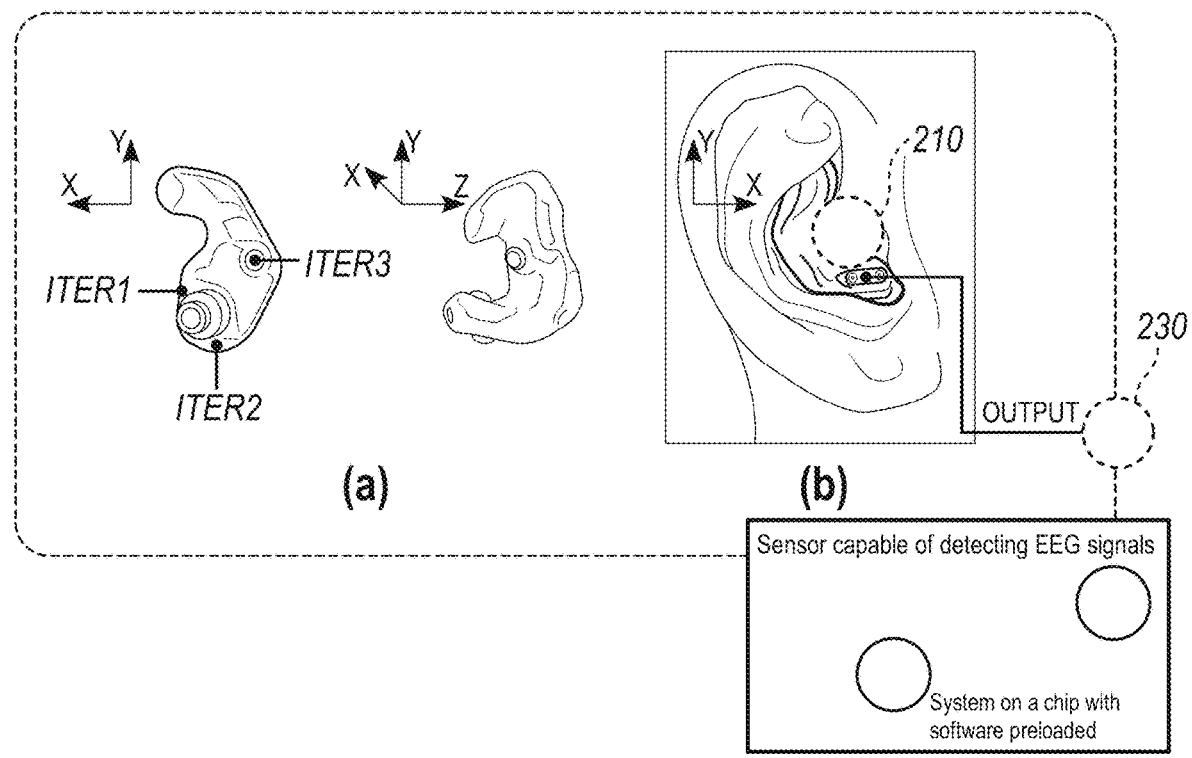
Figure 7C:
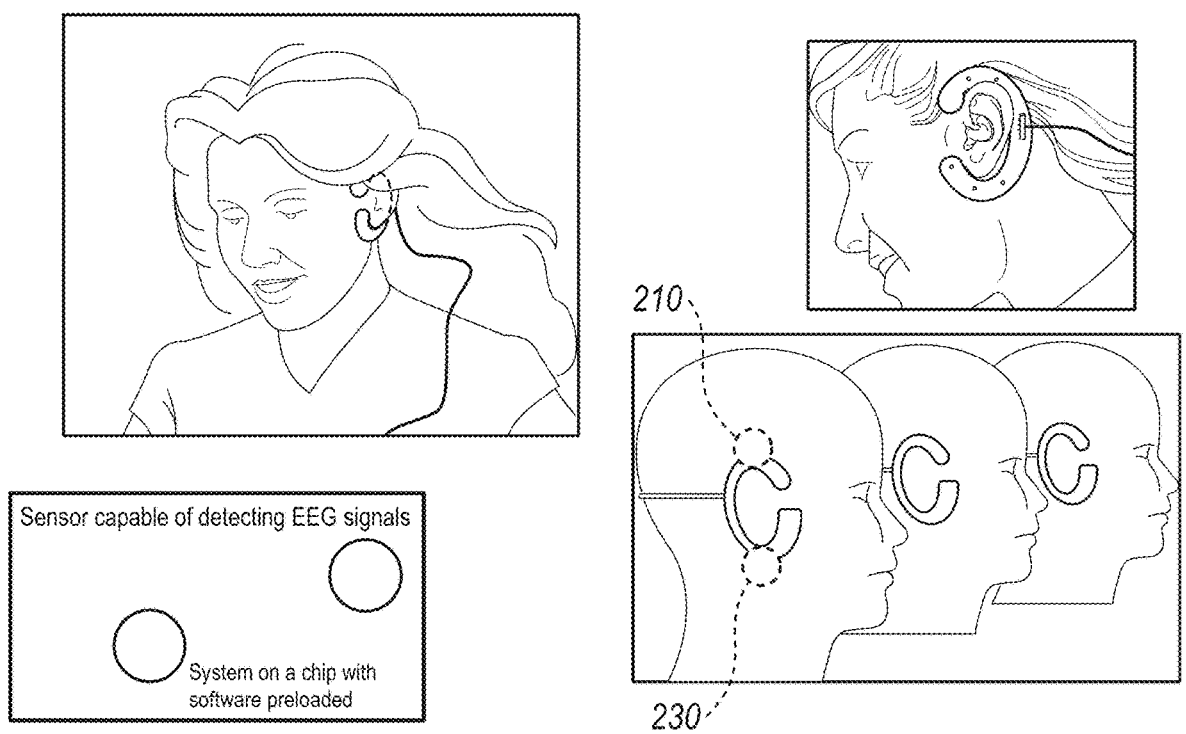
Figure 7D:
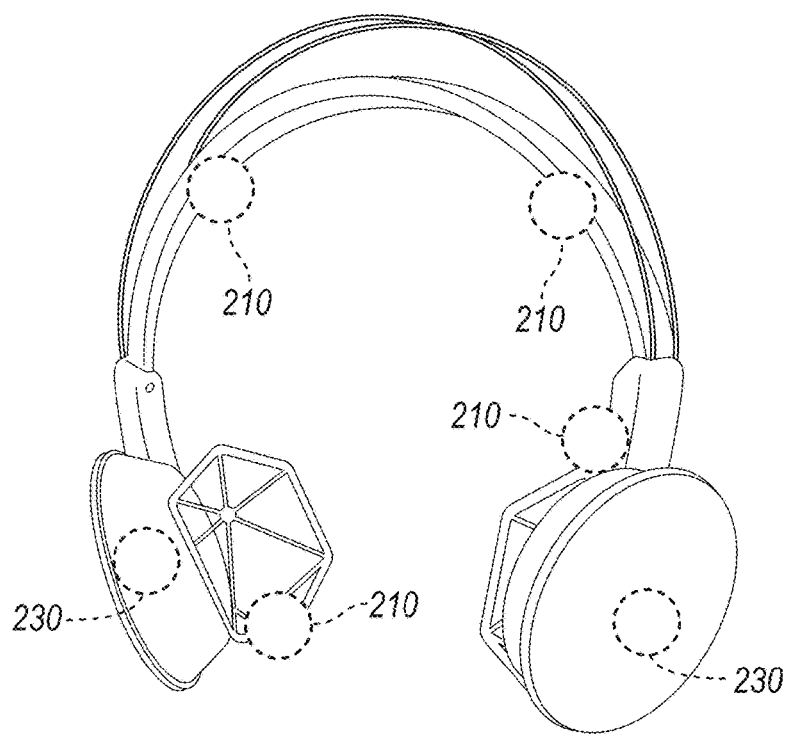
Figure 8:
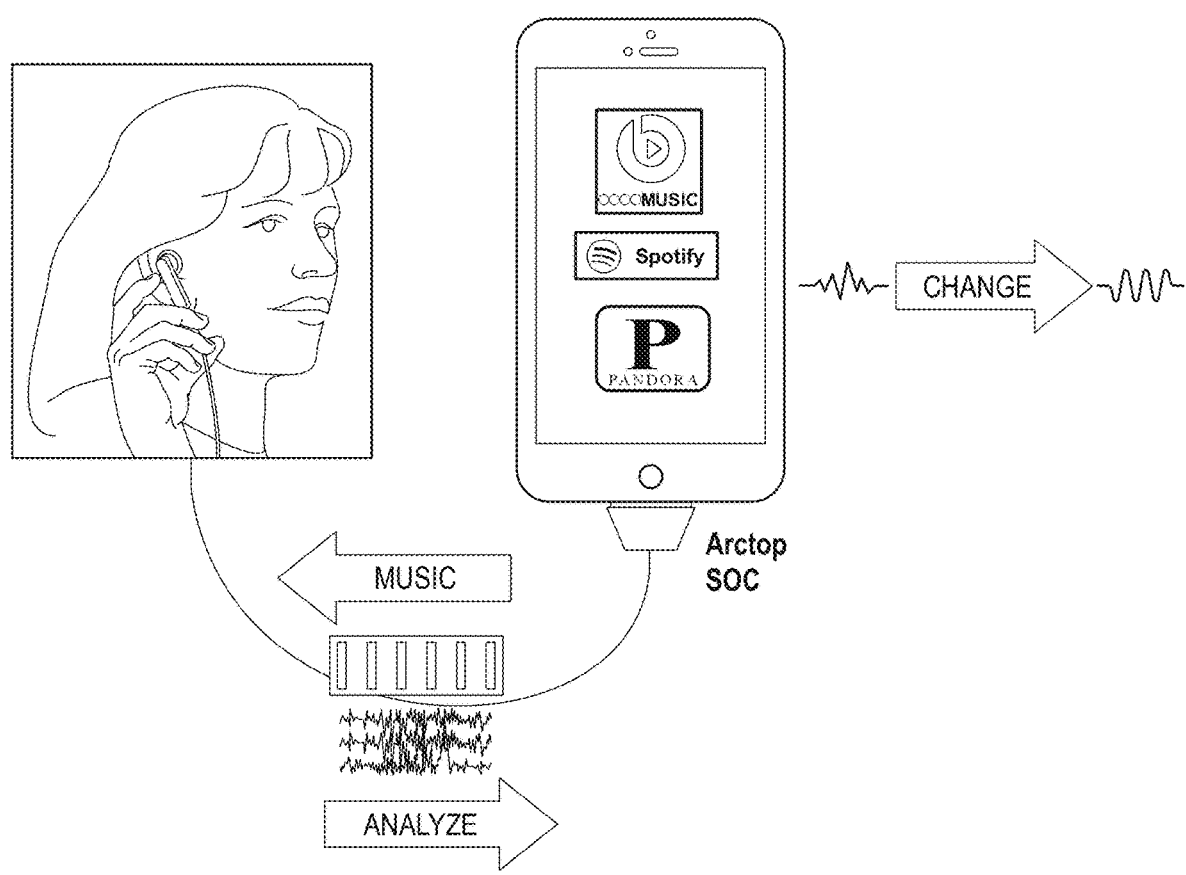
FIG. 8 depicts an application of use of a method and system for providing a brain computer interface.

In relation to positive identification of a user's identity, Block S140 can drive various responses in relation to integrated platforms/devices. In a first variation, Block S140 can include automatically extracting a user model of how the user "clicks" digital buttons associated with interacting with electronic content, using a BCI device or other interface device. In another variation, Block S140 can include automatically populating a password (e.g., at an input box) in response to positive identification of the user, such that the user does not need to remember a password or check another device for a token. In a specific example, the password can be populated into an input box (e.g., of an operating system login page, or a website, or an application, etc.) and/or to a clipboard of a computing device (e.g., personal computer, mobile device, wearable computing device, etc.). This specific example can implement a peripheral device (e.g., a USB-connected device, a Bluetooth-connected device populated with the user-specific calibration model(s) and configured to impersonate a key inputting module of the computing device), as shown in FIG. 6, that has pre-installed code, communicates with at least one of the brain computer interface identification system and/or computing system, and is configured to execute instructions upon positive verification of the user. Such a peripheral device can further be transferrable between different computers/workstations that a user is attempting to access.

Another specific example of Block S140 can also implement a peripheral device to protect copies of professional applications (e.g., video editing software, audio editing software, design software, etc.) and/or systems (e.g., automobiles, other transportation vehicles, robotic agents, etc.). Such software and/or systems can be packaged with a peripheral device that isolates access to a specific user or number of users. In these specific examples, the peripheral device can communicate directly with the application (e.g., software application) or system being accessed. Furthermore, in these specific examples, the peripheral device can facilitate installation of an agent on the host, with implementation of logic in the language(s) compatible with the system(s) of use.

In another specific example, Block S140 can include performing an authentication action within a web application platform (e.g., of a banking system, of a healthcare system, etc.). In this example, positive identification can drive communication directly with provider web services or communication via a web browser to allow an authenticated user to access content. Similar to previous examples, this example can implement a peripheral device to facilitate installation of an agent on the host, with implementation of logic in the language(s) compatible with the system(s) of use. Additionally or alternatively, Block S140 can include authorizing the user to access any suitable computing system (e.g., a mobile device associated with the user, a personal computer associated with the user, etc.).

In another specific example, Block S140 can include comparing a first output of a user-specific calibration model to a second output of the user-specific calibration model. In this example, the first output is generated by the model based on a first neural signal (e.g., gathered during a calibration session) and the second output is generated by the model based on a second neural signal (e.g., gathered during a verification session).

However, Block 140 can additionally or alternatively be conducted in any other suitable manner.

3.4 Method—Authenticated Action

Block S150 includes: based upon the authentication status, performing an authenticated action. Block S150 functions to utilize an output of the authentication status determination to perform an action related to the authentication status of the user. Block S150 can also function to produce any suitable output based on the authentication status of the user. Some actions can require a user to be authenticated in order to be performed (e.g., an authorization action); additionally or alternatively, an authenticated action can include an action that is personalized to the user or otherwise improved by basing the performance of the action on the authentication status (e.g., adjusting an environmental actuator proximal to the user according to user preferences, which are determined based on the user having been authenticated). However, the authenticated can be any other suitable action and/or output.

The authenticated action can be performed by any suitable hardware and/or software module (e.g., communicatively coupled with the BCI and/or related components). In a first variation, performing the authenticated action can include rendering a graphic at a virtual heads up display worn by the user (e.g., rendering a graphic indicating that an option has been selected, as shown in FIG. 13B) in response to determining the authentication status, wherein in this variation determining the authentication status includes determining that the user has selected an option according to a user-specific model of how the user selects objects in a digital environment (e.g., with button clicks, etc.). In more detail, in this example, selection can be associated with communication via a phone call in a digital environment supported by a head-mounted display with input functions. In a second variation, performing the authenticated action can include manipulating a physical object (e.g., unlocking an electronic lock of a door through which the user desires to pass). In a third variation, performing the authenticated action can include adjusting an environmental parameter corresponding to a physical environment associated with the user (e.g., a room temperature, a lighting level, a vehicle air conditioning fan speed, etc.) via a connected environmental parameter actuator (e.g., a thermostat, a connected light switch or light controller, a vehicle computer, etc.).

In a first specific implementation, Block S150 includes adjusting a set of vehicle setting parameters based on the authentication status of the user. The vehicle setting parameters can include radio station presets and other settings related to audio preferences of the user, cockpit setting parameters (e.g., seat position, steering wheel position, rear-view mirror position, etc.), environmental setting parameters (e.g., air conditioning temperature, fan speed, window positions, etc.), driving setting parameters (e.g., suspension settings, handling responsiveness settings, acceleration sensitivity settings, collision-avoidance override sensitivity settings, etc.), and any other suitable vehicle-related settings. In this specific implementation, determining the authentication status of the user includes identifying the user (or verifying the claimed identify of the user) and determining user preferences associated with the identified user. Determining the user preferences can include retrieving user preferences from a database, dynamically monitoring user response to stimuli and/or other events (e.g., monitoring user delight and/or dismay), or otherwise suitably determining user preferences.

In another specific implementation, Block S150 includes: based upon the authentication status, performing an authorization action associated with activity of the user. Block S150 can thus function to grant user permissions based upon one or more criteria or rules defined by an application associated with the methods and systems described herein. In this specific implementation of Block S150, the criteria for authorization can be based upon an analysis of brain activity of the user, such that the user is granted authorization to perform an activity only if the user's brain activity matches the criteria.

In relation to analysis of brain activity, Block S150 can comprise determining activity (e.g., in relation to spectral content, in relation to neural oscillations, in relation to evoked potentials, in relation to event-related potentials, in relation to different frequency bands of activity, in relation to combinations of activity, etc.), from different electrode channels associated with different brain regions of the user, in order to determine activity states in different regions associated with different brain states. In variations, the different brain states analyzed can include one or more of: an alertness state (e.g., a sleep state, alertness level), a state of focus (e.g., focused, distracted, etc.), an emotional state (e.g., happy, angry, sad, scared, calm, surprised, etc.), a mental health state (e.g., a state of depression, a state of psychosis, a state characterized in a manual of mental health conditions, etc.), a neurological health state (e.g. seizure, migraine, stroke, dementia, etc.), a state of sobriety, a state of overt/covert attention, a state of reaction to sensory stimuli, a state of cognitive load, a state of imagery (e.g. of motor action, of visual scenes, of sounds, of procedures, etc.), a memory function state, and/or any other suitable brain activity state.

Additionally or alternatively, the authenticated action can be performed be based on non-brain activity states (e.g., auxiliary biometric signals, auxiliary data, contextual data, etc.). For instance, environmental factors (e.g., an analysis of environmental threats) and/or devices states (e.g., a user's device is wirelessly connected or connected otherwise to a network) can govern performance of the authenticated action in Block S150.

However, any action in Block S150 can additionally or alternatively be implemented and/or performed in any other suitable manner.

3.5 Method—Specific Examples

Variations of the method can include multiple time-locked components in either the calibration session, the verification session, both, or in any other suitable neural signal analysis session. In some examples, the multiple time-locked components can be substantially identical (e.g., identical audio stimuli, identical visual stimuli, etc.). In other examples, the time-locked components can be related but non-identical (e.g., audio stimuli having similar tones in different order, visual stimuli having similar images with different hue pallettes, etc.). In still further examples, the time-locked components can be entirely different (e.g., an audio stimulus followed by a silent video stimulus). However, the method can include any other suitable time-locked components having any suitable relative relationship.

In examples, the method can include determining an emotional state of the user, and alerting an entity associated with the user of the emotional state of the user. In a specific example, the method can include determining that a user is depressed, and automatically alerting a mental health professional that the user is depressed.

In another specific example, the method for providing a brain computer interface includes: within a first time window, detecting a first neural signal of a user in response to a calibration session having a first time-locked component and a first spontaneous component, wherein the first time-locked component comprises a first randomized factor; generating a user-specific calibration model based on the first neural signal; prompting the user to undergo a verification session within a second time window, the verification session having a second time-locked component and a second spontaneous component, wherein the second time-locked component comprises a second randomized factor; detecting a second neural signal contemporaneously with delivery of the verification session; generating an output of the user-specific calibration model from the second neural signal; based upon a comparison operation between processed outputs of the second neural signal with the output of the user-specific calibration model, determining an authentication status of the user; and based upon the authentication status, performing an authenticated action.

In another specific example, the method for providing a brain computer interface includes: within a first time window, detecting a first neural signal of a user in response to a calibration session having at least one of a time-locked component and a spontaneous component; generating a user-specific calibration model based on the first neural signal; prompting the user to undergo a verification session within a second time window; detecting a second neural signal contemporaneously with delivery of the verification session; based upon a comparison operation between processed outputs of the second neural signal with processed outputs of the user-specific calibration model, determining an authentication status of the user; and based upon the authentication status, performing an authenticated action.

The method 100 and/or systems of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of a processor and/or a controller. The computer-readable medium can be stored on any suitable computer-readable media such as RAMs, ROMs, flash memory, EEPROMs, optical devices (CD or DVD), hard drives, floppy drives, or any suitable device in any suitable format. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in a flowchart or block diagrams can represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession can, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for providing a brain computer interface comprising:
    within a first time window, detecting a first neural signal of a user in response to a calibration session having at least one of a first time-locked component and a first spontaneous component, wherein the first time-locked component comprises a first randomized factor associated with an unexpected modification to a first percentage of a first stimulus of the calibration session, the first stimulus not pre-selected by the user;
    generating a user-specific calibration model based on a response of the user to the unexpected modification to the first stimulus captured in the first neural signal;
    prompting the user to undergo a verification session within a second time window, the verification session having at least one of a second time-locked component and a second spontaneous component, wherein the second time locked component comprises a second randomized factor occupying a second percentage of a second stimulus of the verification session, the second stimulus not pre-selected by the user;
    detecting a second neural signal contemporaneously with delivery of the verification session;
    generating an output of the user-specific calibration model from the second neural signal;
    based upon a comparison operation between processed outputs of the second neural signal with the output of the user-specific calibration model, determining an authentication status of the user; and
    based upon the authentication status, performing an authenticated action.

2. The method of claim 1, wherein the first time-locked component comprises a first audio stimulus, the second time-locked component comprises a second audio stimulus, and wherein the first and second audio stimuli are substantially identical.

3. The method of claim 1, further comprising detecting an auxiliary biometric signal within the first time window, and generating the user-specific calibration model based on the first neural signal and the auxiliary biometric signal.

4. The method of claim 1, wherein the first spontaneous component comprises prompting the user to perceive an imagined stimulus, and wherein the second spontaneous component comprises prompting the user to imagine the imagined stimulus, wherein the imagined stimulus comprises at least one of an auditory stimulus, a tactile stimulus, a visual stimulus, an olfactory stimulus, and a taste stimulus.

5. The method of claim 1, further comprising retrieving a user preference from a database based on the authentication status of the user, and wherein performing the authenticated action comprises loading an environmental profile for the user, the environmental profile comprising an environmental parameter of a physical environment associated with the user according to the retrieved user preference.

6. The method of claim 1, wherein performing the authenticated action comprises authorizing the user to access a computing system.

7. The method of claim 1, wherein performing the authenticated action comprises retrieving digital content associated with a physical object with which the user interacts by performing a user-specific action in communication with a brain-computer interface device.

8. The method of claim 1, wherein performing the authenticated action comprises retrieving a model of neurological signals of the user that characterize interactions between the user and digital input devices.

9. A method for providing a brain computer interface comprising:
    within a first time window, detecting a first neural signal of a user in response to a calibration session having a time-locked component comprising a first randomized factor associated with an unexpected modification a first percentage of a first stimulus of the calibration session, the first stimulus not pre-selected by the user;
    generating a user-specific calibration model based on a response of the user to the unexpected modification to the first stimulus captured in the first neural signal;
    prompting the user to undergo a verification session within a second time window;
    detecting a second neural signal contemporaneously with delivery of the verification session;
    based upon a comparison operation between processed outputs of the second neural signal with processed outputs of the user-specific calibration model, determining an authentication status of the user; and
    based upon the authentication status, performing an authenticated action.

10. The method of claim 9, wherein detecting the first neural signal comprises acquiring a signal from a brain activity sensor of a brain computer interface device in proximity to the user.

11. The method of claim 9, wherein the time-locked component of the calibration session comprises a stimulus provided to the user at a series of time points within the first time window, and wherein detecting the first neural signal is temporally synchronized with the series of time points.

12. The method of claim 11, wherein the stimulus comprises at least one of an audio stimulus, a visual stimulus, an olfactory stimulus, and a tactile stimulus.

13. The method of claim 11, wherein the first randomized factor occupies a predetermined fraction of the stimulus from 1%-80%.

14. The method of claim 9, further comprising prompting the user to imagine a stimulus, and wherein the spontaneous component of the session comprises imagination of the stimulus by the user.

15. The method of claim 14, wherein prompting the user to undergo the verification session comprises prompting the user to imagine the stimulus, and wherein the comparison operation comprises comparing a first output of the user-specific calibration model generated based on the first neural signal to a second output of the user-specific calibration model generated based on the second neural signal.

16. The method of claim 9, further comprising detecting an auxiliary biometric signal within the first time window, and generating the user-specific calibration model based on the first neural signal and the auxiliary biometric signal.

17. The method of claim 9, wherein performing the authenticated action comprises populating a set of characters in an input region rendered at a display of a computing device associated with the user.

18. The method of claim 9, wherein determining the authentication status of the user comprises determining a state of the user comprising at least one of: an alertness level of the user, a sobriety state of the user, a mood of the user, and a discomfort level of the user, and wherein performing the authenticated action comprises enabling unlocking of a steering column of a vehicle associated with the user based on the state of the user.

19. The method of claim 9, further comprising retrieving a user preference from a database based on the authentication status of the user, and wherein performing the authenticated action comprises adjusting an environmental parameter of at least one of: a physical environment and a virtual environment associated with the user according to the retrieved user preference.

20. The method of claim 9, wherein the authentication status comprises a cognitive state of the user, and wherein performing the authenticated action.

21. The method of claim 1, wherein at least one of the first percentage and the second percentage comprise a percentage ranging from 1%-80%.

* * * * *

UNITED STATES PATENT AND TRADEMARK OFFICE
CERTIFICATE OF CORRECTION

PATENT NO. : 10,706,134 B2
APPLICATION NO. : 15/645169
DATED : July 7, 2020
INVENTOR(S) : Daniel Furman et al.

Page 1 of 1

It is certified that error appears in the above-identified patent and that said Letters Patent is hereby corrected as shown below:

In the Claims

Column 18, Lines 12-13, remove "modification a first" and insert --modification to a first--.

Column 19, Lines 12-13, after "authentication status of the user" insert --, comprises adjusting an environmental parameter of at least one of: a physical environment and a virtual environment associated with the user according to the retrieved user preference.--.

Signed and Sealed this
Fifteenth Day of September, 2020

Andrei Iancu
*Director of the United States Patent and Trademark Office*